United States Patent

[11] 3,628,729

[72] Inventor John R. Thomas
    Wichita, Kans.
[21] Appl. No. 816,923
[22] Filed Apr. 17, 1969
[45] Patented Dec. 21, 1971
[73] Assignee Livingston Irrigation & Chemical Co.
    Janesville, Iowa

[54] MOBILE IRRIGATION APPARATUS
    39 Claims, 24 Drawing Figs.
[52] U.S. Cl. ..................................... 239/177,
    137/344
[51] Int. Cl. ..................................... B05b 3/00
[50] Field of Search ......................... 239/177,
    212, 213, 1, DIG. 1, 191, 263; 280/34, 103;
    137/344; 60/97 E

[56] References Cited
    UNITED STATES PATENTS

| | | | |
|---|---|---|---|
| 2,650,573 | 9/1953 | Hickman | 60/97 E |
| 2,984,985 | 5/1961 | MacMillin | 60/52 HE |
| 3,314,608 | 4/1967 | Curtis et al. | 239/213 X |
| 3,503,556 | 3/1970 | Moulton | 239/212 |
| 3,352,493 | 11/1967 | Curtis | 239/177 |
| 3,353,750 | 11/1967 | Dowd | 239/212 |
| 3,386,661 | 6/1968 | Olson et al. | 239/212 |
| 3,484,046 | 12/1969 | Harris | 239/212 |

FOREIGN PATENTS

| | | | |
|---|---|---|---|
| 332,308 | 1/1921 | Germany | 239/191 |

Primary Examiner—M. Henson Wood, Jr.
Assistant Examiner—Edwin D. Grant
Attorney—Duane C. Bowen ABSTRACT: A water conduit having sprinkler heads spaced along its length pivots about one end which is connected to a source of water. A series of towers on wheels spaced along its length supports the conduit in its arcuate path which may be 360° or any part thereof, to thereby sprinkle substantially all or part of a tract such as a quarter of a section of land. The other end of the conduit has sprinkler means to irrigate the corners of the field which otherwise would be outside of the circular sprinkling area. Power to the wheels of the towers and control of the system is provided by means including oil hydraulics. The hydraulic control system includes means to reverse power, position sensing means to shut off the system upon misalignment of towers beyond selected tolerances, and adjustable position sensing means to control feed of oil to drive the wheels depending on relative tower alignment (including pulleys and a capstan or other mechanical elements). The tower wheels can be pivoted to tandem position for moving the apparatus from location to location.

PATENTED DEC 21 1971

INVENTOR.
JOHN R. THOMAS
BY Duane C. Bowen
ATTORNEY

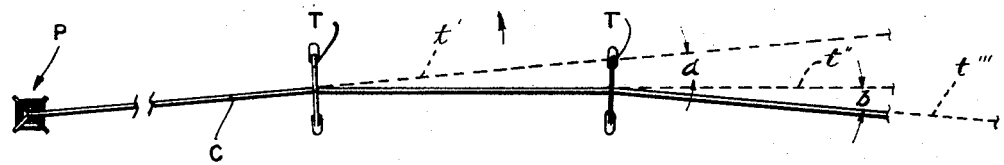
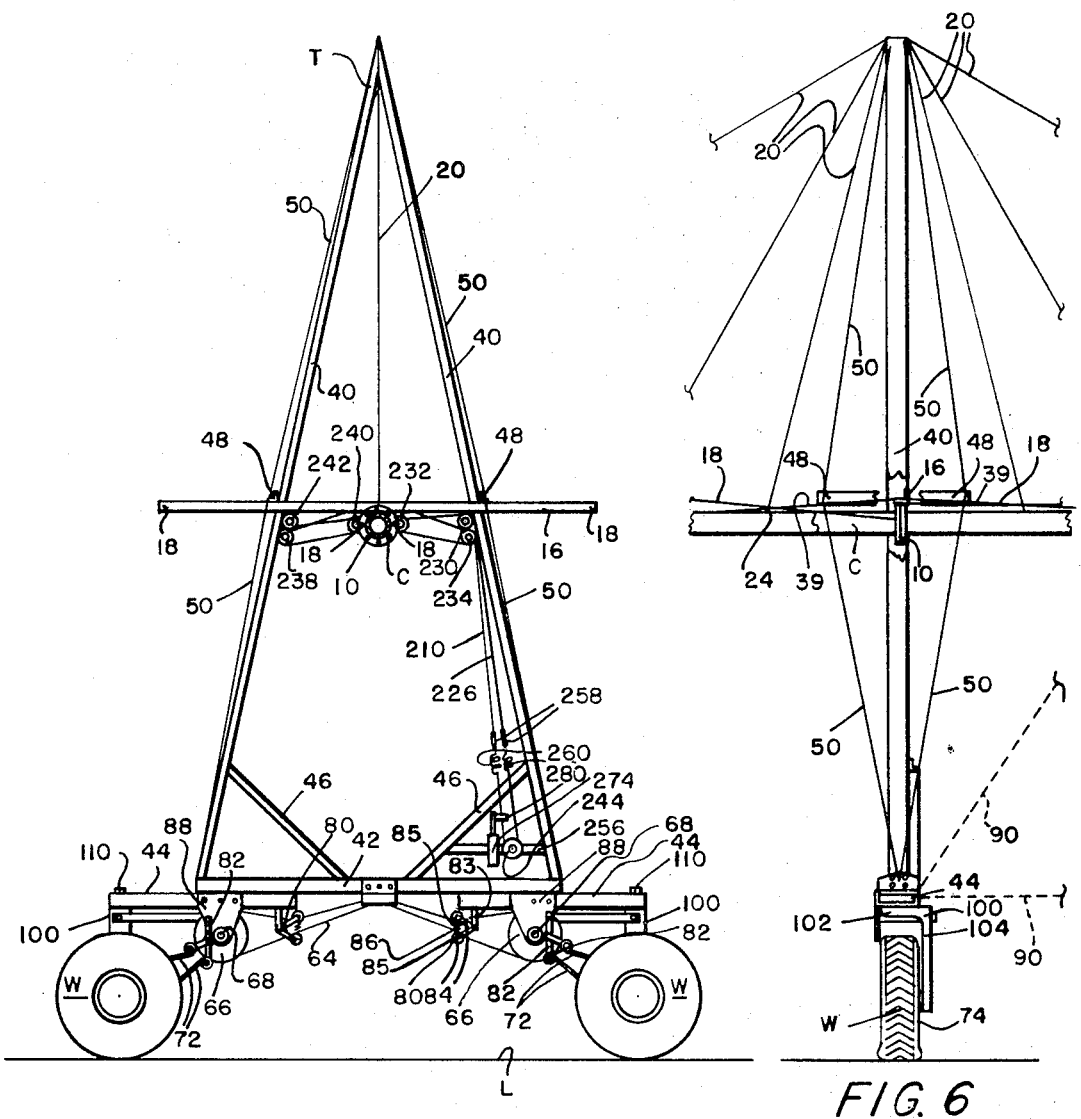

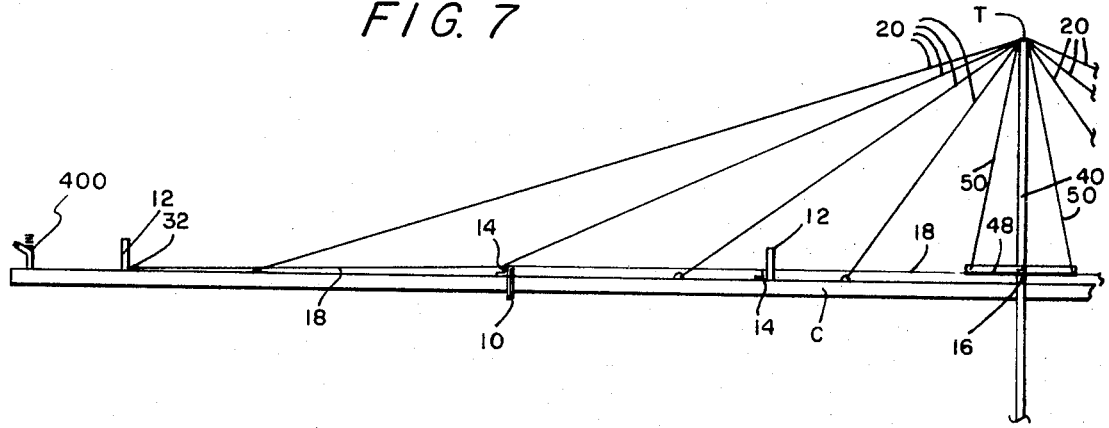
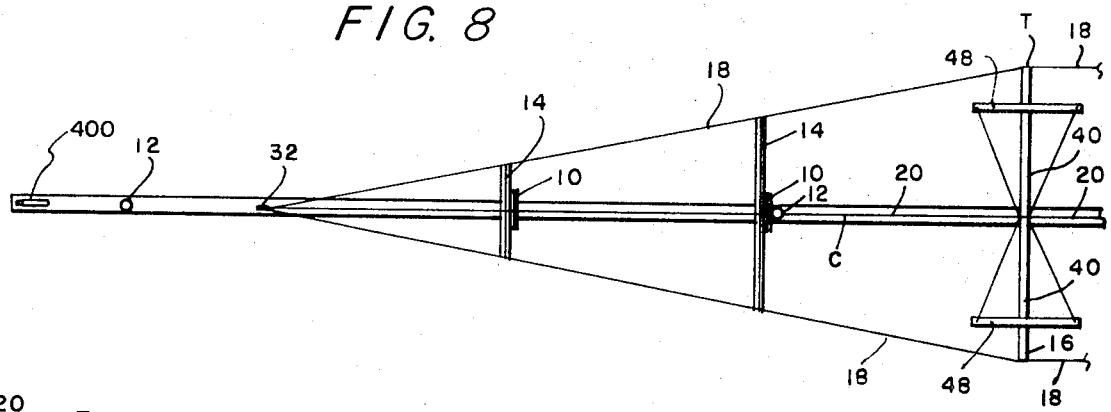
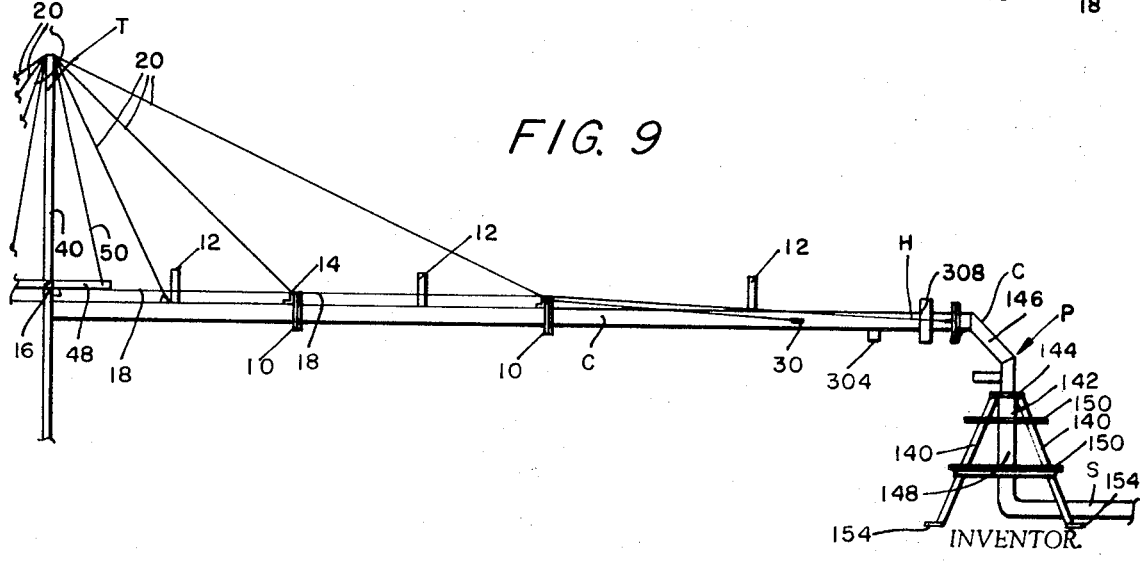
INVENTOR
JOHN R. THOMAS
BY
ATTORNEY

INVENTOR.
JOHN R. THOMAS
BY
ATTORNEY

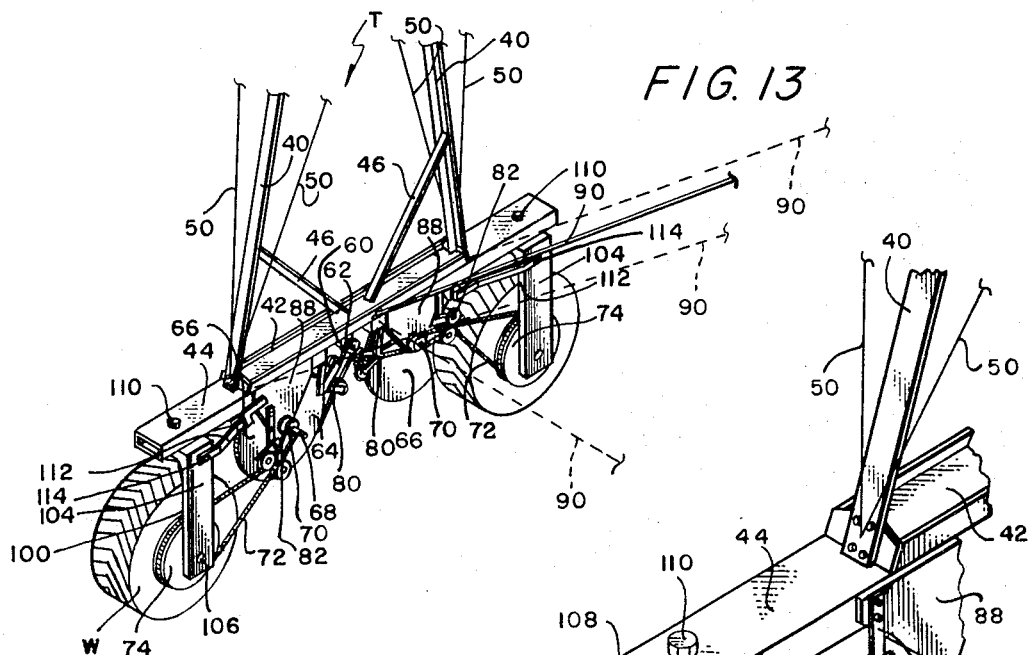
FIG. 13
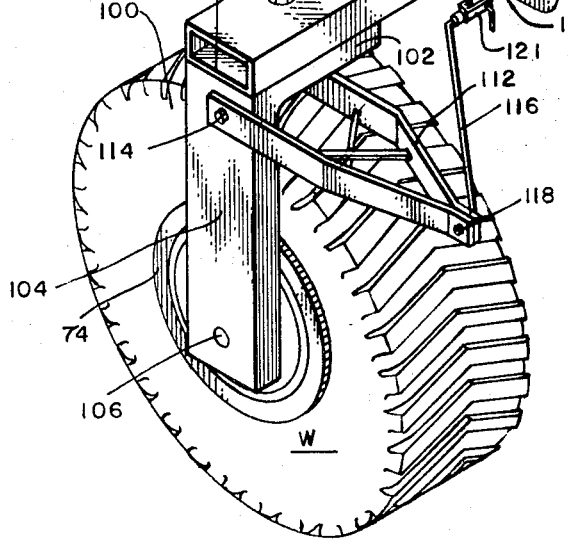
FIG. 14
FIG. 15
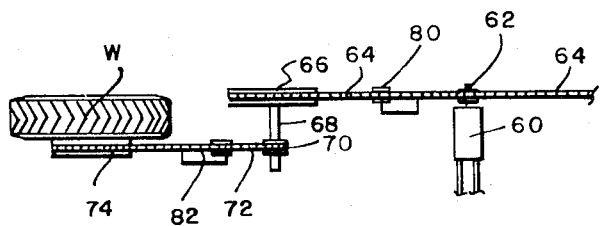
INVENTOR.
JOHN R. THOMAS
BY
ATTORNEY INVENTOR.
JOHN R. THOMAS
BY
Duane C. Bowen
ATTORNEY

PATENTED DEC 21 1971 3,628,729

INVENTOR.
JOHN R. THOMAS
BY 
ATTORNEY

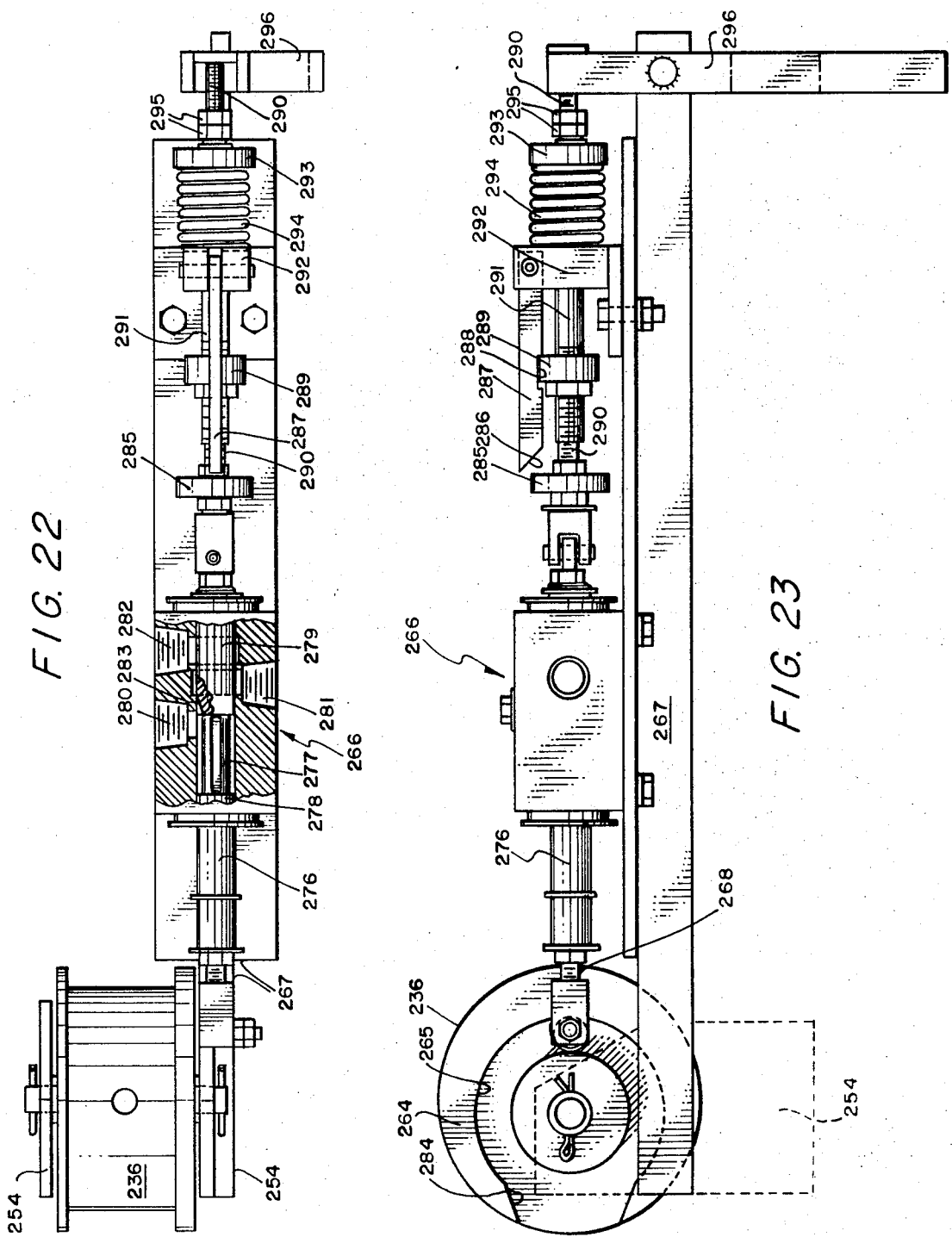

MOBILE IRRIGATION APPARATUS

BRIEF SUMMARY OF THE INVENTION

My invention is an improvement in mobile irrigation apparatus. A hydraulic system is used to drive tower wheels and for system control. Pulleys and a capstan or other mechanical elements are used to sense relative alignment of towers.

OBJECTIVES

In the type of irrigation equipment described above one basic aspect is the power system to drive the wheels of the towers. It is an objective of my invention to use hydraulics for that system.

A difficult aspect of such equipment is the system to keep towers in desired alignment relative to adjacent towers and to the water conduit and to protect against such misalignment as will cause damage to the equipment. This would be a lesser problem if the terrain were perfectly flat but, of course, this is not the case with land which, depending on its location, can have considerable unevenness which needs to be tolerated by the equipment within some limits. It is an objective of my invention to devise an improved control system for alignment and for shutoff in case of gross misalignment, including devising a hydraulic system as part of that control system. It is a further objective to devise a pulley and capstan or other mechanical position sensing subsystem.

If equipment is used to irrigate a square tract of land (for example a quarter of a section), the corners present a special problem as the equipment inherently has basically circular coverage. To the extent the corners are not irrigated by the equipment with the same thoroughness as other areas, to that extent the equipment does not do the complete job. It is an objective of my invention to devise an improved corner sprinkling system and particularly one with hydraulic control.

It is sometimes desirable or required that the equipment operate in less than a 360° travel, or to reverse over an arcuate track, as for example when a crop in one area needs extra irrigation, when the tract to be irrigated is not square (or circular) so that 360° pivoting is inapplicable, etc. It is an objective of my invention to devise a control system for controlling sweep to a selected arcuate distance, or to reserve the sweep, etc., and particularly such a system as a portion of a power and control system which is partly hydraulic. It is believed a power and control system which is partly hydraulic can be made highly applicable to mobile irrigation equipment including adaptability to its massive nature, to the considerable power requirements, to the difficult and complex control requirements, and to the needs for economy of manufacture, simplicity of design and operation, low maintenance, ease operation and reliability.

There are other aspects of the equipment and problems to be overcome, and my design has other objectives and advantages which will be best understood from the following description, read with reference to the drawings, in which:

FIG. 4 is a partial plan view on enlarged scale.

FIG. 5 is an enlarged face view of one of the towers.

FIG. 6 is an end view of the same tower.

FIG. 7 is a side view of the structure at the moving end of the irrigation apparatus.

FIG. 8 is a top view of the structure shown in FIG. 7.

FIG. 9 is a side view of the structure at the fixed pivot end of the irrigation apparatus.

FIG. 13 is an enlarged, fragmentary perspective view of the lower end of one of said towers.

FIG. 14 is an enlarged, fragmentary, perspective view of the wheel area of one of said towers, viewed toward the opposite corner to the one viewed in FIG. 13, the wheel being shown in tandem position for towing of the irrigation apparatus from one location to another.

FIG. 15 is in the nature of a top schematical view of the drive to one of the tower wheels.

FIG. 22 is an enlarged top view, partly in section, of a tower valve control assembly.

FIG. 23 is similar to FIG. 22 but taken in elevation.

FIGS. 1, 2, 3, and 4

The general layout of the irrigation system is shown in FIGS. 1–4. A water conduit or distribution pipe C is supported by a series of towers T which are mobile on wheels W and pivot about a central pivot structure P which is fed by a water supply S to irrigate by sprinkling an area of land L. Thirteen towers T are shown which, in the specific embodiment, are designed to irrigate a quarter section (160 acres) of land L, which means that conduit C is about 1,300 feet long and towers T are spaced about 100 feet apart. The circular area A' passed by conduit C leaves corner sections A" not directly covered. As later related, corner sections A" are irrigated by end nozzles on conduit C.

Whereas it would be convenient for there to be a well adjacent pivot structure P, this will often not be the case so that a water supply pipe S will carry water to the pivot area P to feed conduit C from a remote source, whether the water comes from wells or another type of water source. A water pump is not shown but it will be understood that pump means will be needed to force the water to pivot point P, up into conduit C and out of sprinkler heads. Sometimes there will be a remote water pump, such as at a well, and a booster pump at the location of pivot tower P. Pump or water volume and pressure levels are not detailed here as such matters are well known in the art and are common to other known mobile sprinkler systems of this general type. A 6 inches or 6-⅝ inches distribution pipe for conduit C usually will be applicable for strength requirements, flow rates, etc. Towers T have general configurations that can be termed of A-frame type.

I have found that for traction and other considerations, pneumatic tires on wheels W of the general ribbed type manufactured for tractors and the like are suitable and will give adequate traction even in maximum moisture conditions. It will be understood that wheels W follow arcuate paths but I have found they generally can be set substantially at right angles to a radius from pivot tower P as they will adjust from straight travel to arcuate travel by a small amount of sidewise skidding under tension from conduit C, as the differences between arcuate and straight travel are small in the magnitudes of circular radii involved. A slight arcuate adjustment of the first few towers T adjacent pivot P, however, will be advantageous. Wheels W at the remote end from pivot P understandably go farther and faster than inner wheels, but the speeds are relatively low even at the remote end tower under suitable irrigation rates. For example, consider about a 7,800 foot circumferential travel of the end tower at a maximum speed of about 16 hours per revolution of the system. Maximum time per revolution usually will be about 100-110 hours.

Figure 3:
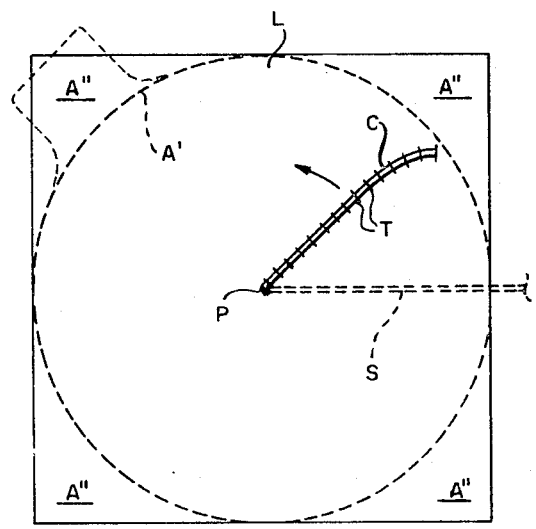
FIG. 3 is a plan view thereof.

It will be observed in FIG. 3 that conduit C does not follow a true radius but is rather in a curved line with the outer end trailing in the direction of advance, i.e., the curve has its convex side facing the direction of advance. The line is relatively straight at towers 1-9 (from the inside) and most of the curve is at towers 10-13. This configuration is used because it keeps conduit C under tension. If the line were to be kept straight, or even to be oppositely curved, the compressive forces would be of unacceptable magnitude. This configuration is further illustrated in FIG. 4 where it will be observed (in an area representative of towers 10-13) that a first inner tangent $t'$ to conduit C forms an angle $a$ with a second tangent $t''$ which in turn forms an angle $b$ with a third outer tangent $t''''$. Particularly because conduit C is not fixed to a point on each tower T, the conduit C tends more toward a general curve than a series of angular bends. It might be noted at this time, however, that pickup of relative movement between towers T in order to control relative position by controlling drive to wheels W is a pickup of lateral motion of conduit C relative to each tower T rather than being essentially a pickup of bending of conduit C.

FIG. 3 should not be interpreted as meaning that the irrigation apparatus is always used with a quarter of a section of land L, that the land will always be a square tract, or that the tract will be planted to a single crop with uniform irrigation requirements. For example, the land shown in FIG. 3 may be planted in two or more crops, and, as will later appear in this disclosure, the system may be controlled to sprinkle only one sector of land L, may even be used to reverse over that sector, etc. The system could be used for a 180° sweep for an elongated rectangular area. Other variations in land situations to be irrigated include farmstead locations (which often interrupt otherwise rectangular fields); impassable gullies or ravines; and other irregularities or impediments. The manner of adjustment of operation of the equipment I have disclosed to accommodate such situations will be understood by those working in the art, i.e., one can think of a situation in which a 340° limit in rotation instead of a 360° complete rotation will avoid an obstacle in question, such as a farmstead or ravine.

The Guy—Wire System

FIGS. 1, 2, 5, 6, 7, 8, 9, 10 and 11 should be consulted particularly for the disclosure of the guy wire systems (in horizontal and vertical planes). There is some foreshortening lengthwise in FIGS. 10 and 11 particularly in order to show the guying, etc., as the towers T are actually about 100 feet apart and exact scale would make other parts too small for clear illustration.

Figure 10:
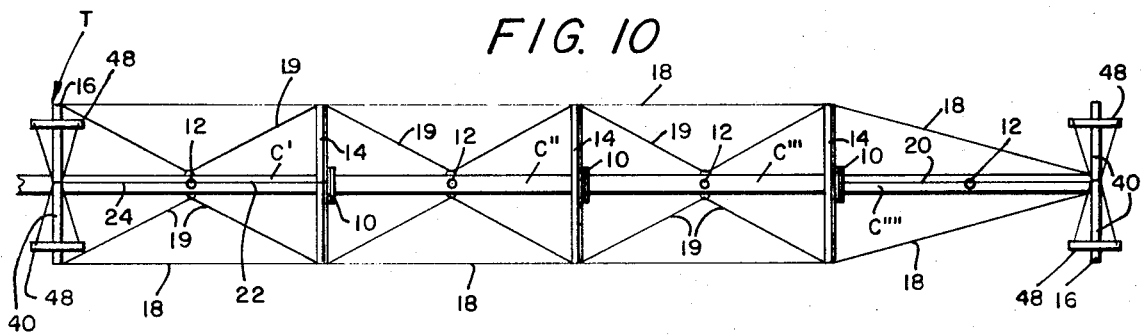
FIG. 10 is a top view of a typical section of the apparatus between two towers intermediate the ends of the apparatus.

Considering first FIG. 10 which shows the normal guying in a horizontal plane between towers T, note that conduct C is formed from a series of sections $c'$, $c''$, $c'''$, and $c''''$ which are joined by bolted, sealed end flanges 10. It may also be noted that sprinkler nozzles 12 are shown centrally of each conduit section, which is sufficient for the sprinkling function although greater or lesser spacing would depend of water gallonage and pressure, nozzle design and/or choice of design.

Figure 16:
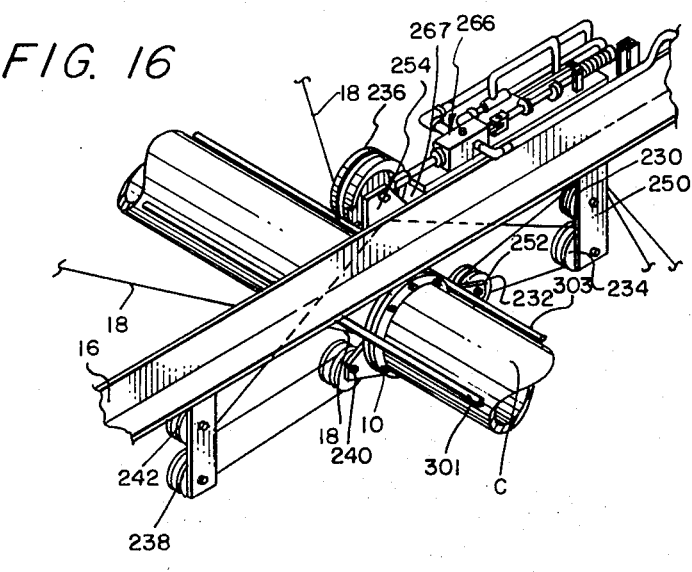
FIG. 16 is an enlarged, fragmentary, perspective view of the control assembly on a tower concerned with picking up sidewise movement of the water conduit relative to the tower.

Flanges 10 are a convenient place to secure crossarms or spars 14 which are bolted to the flanges and may be formed of angle iron. Towers T have crossarms or spars 16 extending from beyond one side to beyond the other side that may be formed of angle iron, Tee bar, etc. (and actually may be formed of an intermediate section and two end sections bolted or welded in place rather than being one continuous angle iron). The outside guying wires 18 are suitably secured to the outer ends of spars 14, 16. As viewed in FIGS. 10 and 11, the left is toward the outer end of conduit C and the right is toward pivot P. Guy wires 18 are secured to the spar 16 of the outer tower T but, instead of securing to the spar 16 of the inner tower T, secure to a conduit flange 10 in the plane of the tower (as best seen in FIG. 16). This feature, the tying of horizontal guys 18 only to outer towers and not to inner towers in the series between innermost and outermost towers, together with the guying in a vertical plane (which are essentially the only securing of conduit C to towers T and the only means of support of conduit C), relates (a) to permitting conduit C to curve or bend as shown in FIGS. 3 and 4 (b) to supporting conduit C but permitting it to shift laterally relative each tower T so that this relative movement can be picked up as a control function by the pulley and capstan means particularly shown in FIGS. 5, 16 and 17 and later to be described (or by other means), and (c) to permitting tower T to have a different positions of its lateral central line relative to conduit C within the limits set by the system controlling application or power to drive tower wheels W. To an extent, of course, mere elongation of guys under tension, play of parts having suitable tolerances, bending of spars, etc., could accommodate some of the shifting and bending in any case because of the great length of the apparatus but the direct provision for (a), (b) and (c) above by not fixedly securing inner tower spars 16 directly to conduit C is a better solution. My system provides for change in direction of pivoting about a field, which is a reason not for having merely longer guys 18 on the convex leading side of conduit C than the concave trailing side of the conduit. The guy wires can be of wire or cable depending on load factors. Bracing guys 19 extend diagonally between ends of spars 14 and intermediate locations on conduit C (and secured by suitable means such as clips secured to conduit C by screws).

Figure 11:
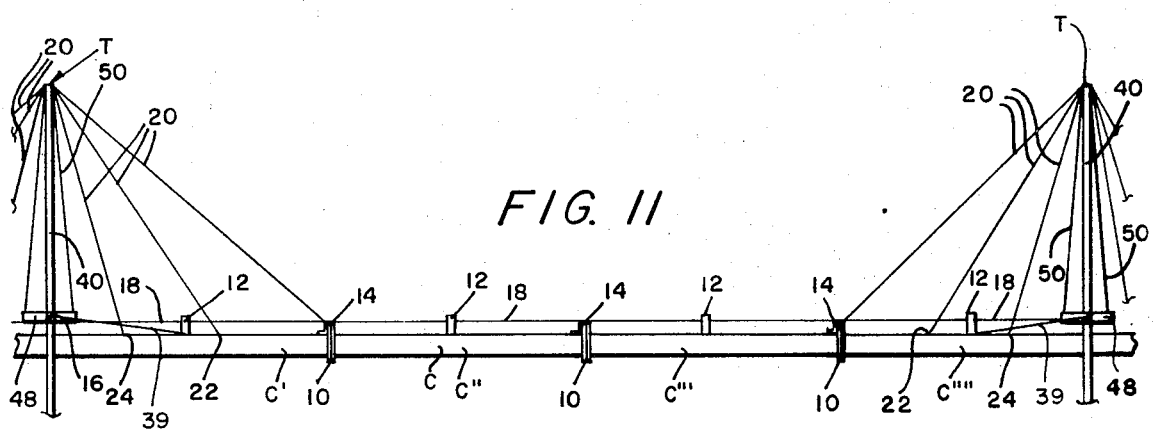
FIG. 11 is a side view of the structure shown in FIG. 10.

Turning now to the FIG. 11 illustration of guying in a vertical plane between intermediate towers T, preferably three guys 20 are attached to the tower top and connect to conduit C at each side of each tower T, the outermost guy attaching adjacent to the nearest flange 10 or spar 14, and the two other guys 20 attaching to conduit C in a suitable manner at two other points 22, 24 between that flange 10 and tower T. As before stated, conduit C is not directly secured to towers T and the vertical load of conduit C is primarily borne by guys 20, so that conduit C is hung from towers T. Also as before stated, this is part of the system for permitting bending of conduit C and of permitting relative movement between towers T and conduit C in the pickup of control of power to towers T. Another purpose and advantage of having conduit T not fixedly secured to towers T is that the terrain of land L may be termed "rough" in terms of trying to have all parts (i.e., conduit C and towers T) lined up in classical or ideal vertical and horizontal disposition. For example, in FIGS. 1 and 2, the innermost tower T may be in a relative depression, the next tower T may be in a relative rise, the next tower T may be on an even higher rise, the next tower may be lower and on a lateral grade tipping the tower in a transverse plane, etc.

In fact, with around 100 foot tower spacing, conduit C usually will droop in a vertical plane particularly in the area centrally between towers and between guys 20 and may have relative humps at about the location of towers T even if the land were perfectly flat, which unevenness is accentuated responsive to roughness in terrain. It is part of the philosophy of my design to depend partly on the strength of conduit C to permit bending in both vertical and horizontal planes. Experience has shown that it is impractical to try to maintain parts in alignment with X, Y and Z-axes, due to the expense of extra and unnecessary guying and other apparatus, the heavy loads of parts in trying to maintain such ideal alignments, the roughness in terrain, and the impracticability of trying to control tower movement and desired alignment when the towers are fixedly secured to conduit C.

Note should be taken of the fact that each tower T is generally independently aligned relative to other towers, i.e., the positions in lateral planes are partly dependent on the positions of wheels W on any relative lateral grades and the tops of the towers are not tied directly together or trussed together by guy wires meeting at a central point of the conduit between towers. This means that towers T can lean away and toward each other in a vertical plane, responsive to terrain and disposition of conduit C, the tipping toward and away from each other being limited by guys 20 and the limits of bending of conduit C, together with anchor cables 39 secured to spar 16 and to conduit C at points about 15 feet each side of tower T. As indicated above, my system does not even require each tower lateral central line to have the same alignment with conduit C, or, to put the matter in a different way, I have found it impractical to try to maintain such alignment even if it were consistent with the wheel drive control system.

Figure 1:
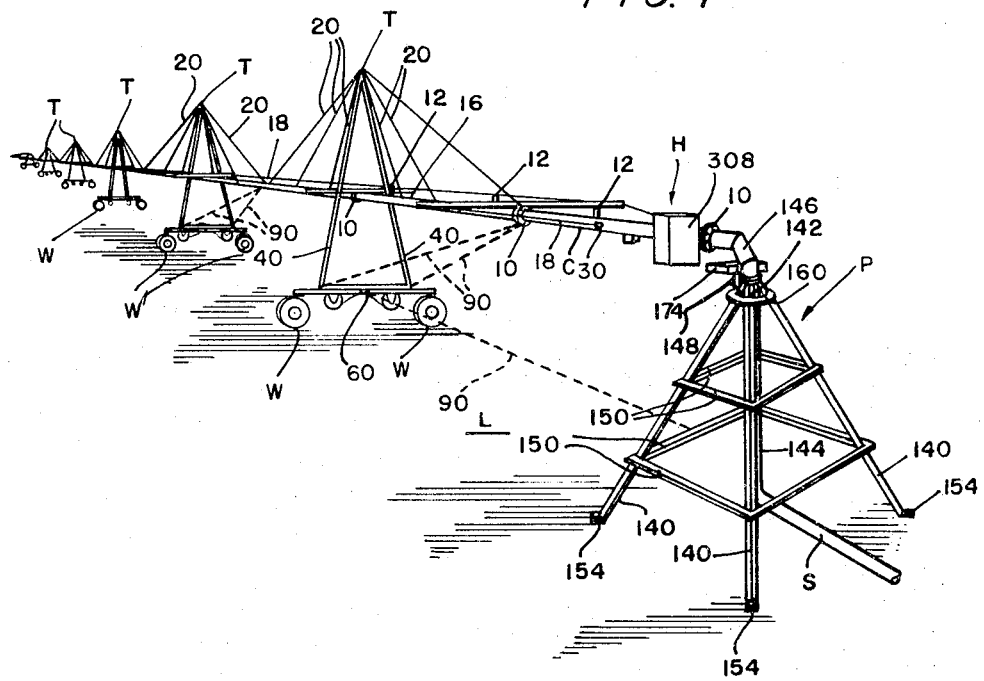
FIG. 1 is a perspective view of a specific embodiment on my mobile irrigation apparatus.
Figure 2:
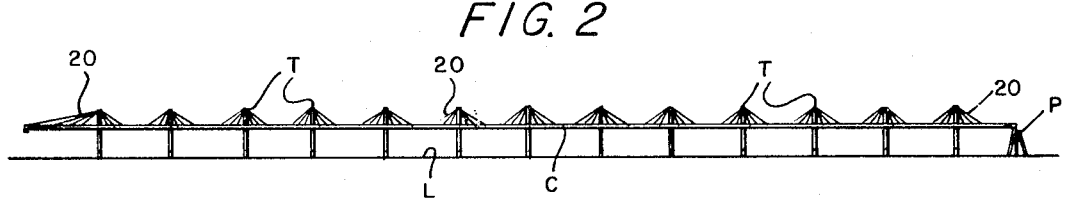
FIG. 2 is a side view thereof.

Turning to FIGS. 1 and 9, the guying between the inmost tower T and pivot structure P is shown, which includes three guys 20 in the vertical plane and includes horizontal guys 18 to spar 14, with the horizontal guys then connecting inboard to a point 30 on conduit C, there also being diagonal guys 19 (not shown but the same as shown on the left-hand side in FIG. 10).

Referring then to FIGS. 7 and 8, the guying at the outer end of conduit C includes four guy wires 20 from the end tower T, four being needed because the end of conduit C is supported in a cantilevered manner. The topmost guy 20 preferably runs freely over the top of tower T and attaches to the conduit near the next inner tower T to assist in this cantilevering function. In the horizontal plane, two spars 14 (of progressively shorter length outboard), have their ends connected to tower spar 16 by guys 18 which are connected at their outer ends to conduit C at a point 32.

Tower Construction

Referring particularly to FIGS. 5-6, 13-15, and 19-20 the towers T, as before mentioned, have essentially the forms of A-frames, and the basic structural components (variously bolted, riveted and welded together which are matters of choice and well understood in the art) are uprights 40 secured together at the tower apex, crossarm or spar transverse members 16, bottom transverse members 42 superimposed to end extensions 44 (the first being an upwardly facing channel and the latter being a downwardly facing channel), braces 46, and the short spars 48 seen in side view in FIG. 6 which, together with guy rods 50 to the top and bottom of uprights 40, add strength to the assembly. It will be understood that these members will be fabricated out of structural metal such as angle irons, T-shaped sections, channels, etc., and as these are matters of choice and well understood in the art they will only occasionally be specified. I will not describe the pulley and capstan control pickup structure, shown in these views, at this time as they do not have a structural function.

I will next describe the drive to wheels W on each tower T. A hydraulic motor 60 (driven from a source of hydraulic fluid under pressure) is suitably secured to bottom plate 42 and has a sprocket or toothed drive shaft 62 engaging two endless chains 64 extending to large sprockets 66 secured to a common shaft 68 with small sprockets 70 which are connected by two more endless chains 72 to large sprockets 74 on wheels W. The general speed reduction between motor 60 and wheels W will be evident from the view and is dependent on the pressure and flow capacity to motor 60, the size of motor 60, the size of wheels W, and the desired maximum speed of wheels W. The maximum speed of course is needed on the outmost tower as it will travel the maximum arcuate path but I have chosen to design all towers alike in all respects except as noted, including the drive chains, and to vary travel of the towers by control of application of fluid to motors 60. The end tower is adjustably driven at selected speed.

Spring biased chain tighteners 80, 82 have sprocket wheels engaging chains 64, 72 respectively. These tighteners are conventional items and will not be detailed other than to point out in one of the tighteners 80 in FIG. 5 that a depending arm 83 supports a pair of relatively pivotal arms 84 having sprocket wheels 85 engaging chain 64 and having a spring 86 between arms 84 bearing them into engagement. Shaft 68 is supported by suitable bearings in brackets 88 depending from base members 44.

Wheels W are supported for pivotal adjustment between the normal position in use shown particularly in FIGS. 5, 6, 13, 19 and 20 and the position shown in FIG. 14 which is used in transporting the apparatus from location to location. Although the apparatus may be used rather permanently in one location, or only be occasionally changed in location, the feature shown in FIG. 14 is valuable because otherwise the apparatus would have to be disassembled even to be moved between adjacent land quarter sections. In order to move the apparatus, all tower wheels W are changed from the FIG. 13 and 19 to the FIG. 14 disposition. The pivotal assembly P can be disconnected and transported separately, can be towed on skids, can be moved on wheeled supports, etc. Before towing it is preferred to secure draglines 90 between pivot tower P and the next tower T and between each baseplate 42 and the conduit C at a location forward of each tower T, as indicated in dotted lines FIGS. 1, 6 and 13. It will be understood that the draglines 90 during trailing, tandem movement of the assembly reduce strain on the towers T as towing forces are thus applied close to the level of wheels W rather than at the level of conduit C wherein there would be a long depending moment arm to wheels W.

To now detail the pivotal wheel adjusting mechanism, FIGS. 5, 6, 13, 14, 19 and 20 particularly show that wheels W are supported by inverted L-shaped brackets 100 having an upper flange 102 and a depending leg 104 to which wheel is supported by cantilevered, stub axle and bearing means 106 which are not detailed as such cantilevered stub axles will be understood by those skilled in the art and are found in various pieces of equipment. A lower plate 108 is welded on channel 44 above flange 102 to provide a planar bearing surface. A pivot bolt 110 is provided through channel 44, plate 108 and upper flange 102 having the function of a kingpin or the like for pivotal adjustment of the position of L-shaped bracket 100. The pivotal connection does not require antifrictional characteristics as adjustment to the FIG. 14 tandem position only occasionally occurs and slight angular adjustment of the normal FIG. 13 and 19 position is primarily during the original installation and testing period.

A bifurcated arm 112 is pivotally secured to depending leg 104 by bolt means 114. In the transport FIG. 14 position, a radius rod 116 is temporarily secured at 118 to the end of arm 112 and to a bracket 120 secured to flange plate 88 as by having a threaded end extending through opening in arm 112, a nut thereon, and having the other end threadedly engaged in a socket clevis 121 pivotally supported on bracket 120. Radius rod 116 thus temporarily secures arm 112 in position wherein wheel W tracks in a position generally right angular to base plates 42, 44 and generally parallel to conduit C. It will be understood that endless chain 72 is disconnected in the process of adjusting wheel W to the FIG. 14 position.

Figure 19:
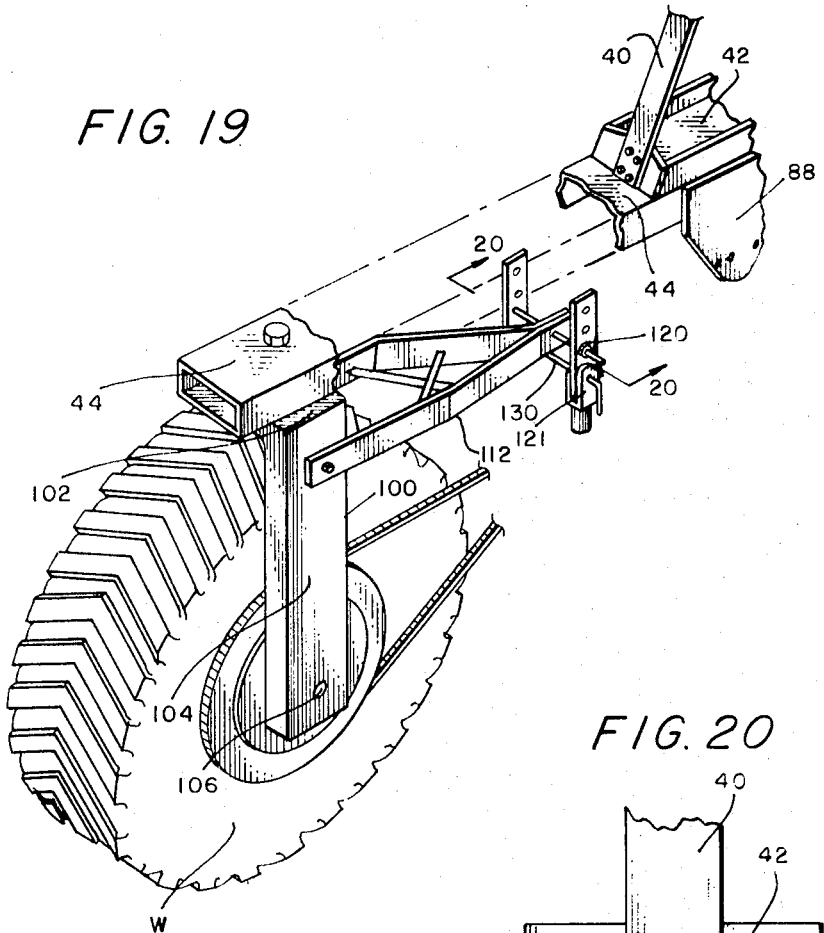
FIG. 19 is a perspective enlarged perspective view similar to FIG. 14 but having the wheel in normal operating position.
Figure 20:
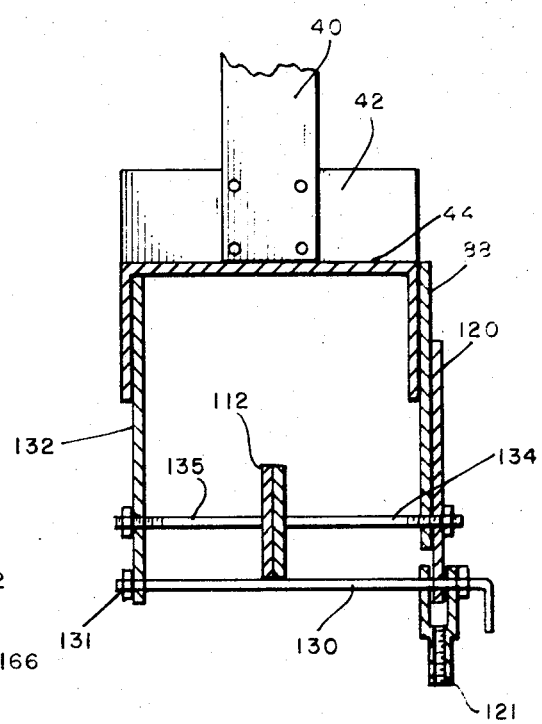
FIG. 20 is a view primarily in section taken on line 20—20 of FIG. 19.

FIGS. 19, 20 and 13 are particularly pertinent to the adjustment of wheels in operating condition (in which they are preferably substantially at right angles to the local general tangent to conduit C). Arm 112 is held up in position by resting on rod 130 secured by nut 131 and extending between bracket arm 120 and an arm 132 welded in depending manner from bottom plate 44. Its angular adjustment is controlled by a pair of setscrews 134, 135 threadedly engaged in arms 120 and 132 and having their ends bearing on opposite sides of arm 112, whereby angular adjustment of arm 112 is made by loosening one setscrew and tightening the other. In the process of adjusting to the tandem position of FIG. 14, rod 130 is removed, permitting arm 112 to drop.

Central Pivot Structure

Figure 12:
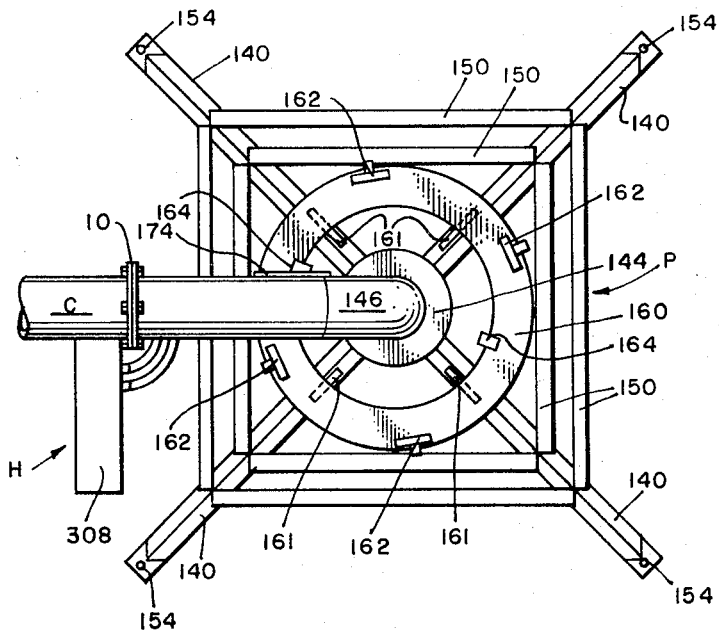
FIG. 12 is an enlarged top view of the pivotal end structure of the apparatus.

Referring particularly to FIG. 1, 9 and 12, the central pivot structure P has four legs 140 joined near their upper ends (as by riveting, bolting or welding) to the upper collar bearing 142 to form a support for the inner end of conduit C which has an annular flange 144 resting on bearing 142, the flange being welded to an elbow 146 on conduit C. As pivoting movements are slow, the pivotal bearing surfaces do not have to be antifrictional bearing means. The end of elbow 146 fits in the upper end of standing pipe 148. Suitable packing means is indicated at 149 but is not detailed as similar structures are found in the prior art and will be understood by those skilled in the art. Standing pipe 148 is joined to supply pipe S. A thrust collar 151 is secured to conduit portion 146 below collar 142 to hold the portion 146 from being forced out of pipe 148.

Horizontal structural members 150 secure legs 140 together into a tower of suitable strength. The legs 140 are suitable anchored to the ground or concrete base at 154 (or, for example, to a skid which is secured to the base) to accept some axial tension in conduit C (and it will be evident guy wires could be substituted) but it is noted that maximum tension is of a low order of 1,500 No. or less, i.e., most generally the force measures about 700 No. The low tension loading on pivot P is due to the fact that towers T are designed to follow arcuate paths with minimum tension.

In the drawings the inner end of conduit C is shown as supporting various hydraulic source and control components H, suitably secured thereto, but the hydraulic components will be later described.

Figure 21:
FIG. 21 is a side view, partly in section, of portions of the central pivot structure.

Legs 140 support a ring 160 by bracket means 161. Outer cams 162 are secured to the outer upper margin of ring 160 and inner cams or stops 164 are secured to the inner upper margin of ring 160. The cams and stops 162, 164 are secured in the manner of C-clamps with lower screw members 166 (see FIG. 21). They are selectively positioned according to desired control movement. Outer cams 162 are located to control the end gun nozzle (in irrigating corner sections A") and it will be understood they would be located about 90° apart if a square field were to be irrigated in 3602 sweep. Inner stops 164 may be used to control arc of movement of conduit C by shutting off power at the end of a desired arc of travel, or they may be used to shut off the apparatus after a 360° sweep. These control functions will be better understood in connection with the later description of the hydraulic control circuitry. Hydraulic means H have depending control members (or dogs or cam followers) 170, 172 supported by hydraulic valve unit 174 supported by elbow 146, in position to be abutted or cammed by stops 162, 164. Member 170 is a cam follower and has vertical movement riding up on a cam 162 at the beginning of a corner A" to initiate end gun irrigation and falls down off the cam 162 at the end of a corner A" to terminate end gun irrigation. The end gun in operation having a fixed area of irrigation coverage, this means that the corner A" is not perfectly covered but is substantially covered, as indicated in dotted lines at the upper left-hand corner in FIG. 3, the exact contour of the dotted line area depending on the nature and size of the end gun (which will usually be oscillatory), its settings, water pressure, the location and length of cams 162, etc. Member 172 is essentially a pivoted dog, handle or lever controlling a four-way, three-position valve and having a neutral vertical "off" position and having "on" positions at either side of neutral (the side determinating the direction of "on" operation). It will be understood that cams or stops 164 when abutted by dog 172, pivots dog 172 from an "on" position to the "off" position to terminate equipment operation until reset or otherwise operated by an operator to initiate another irrigation operation.

Tower Drive Control

Figure 17:
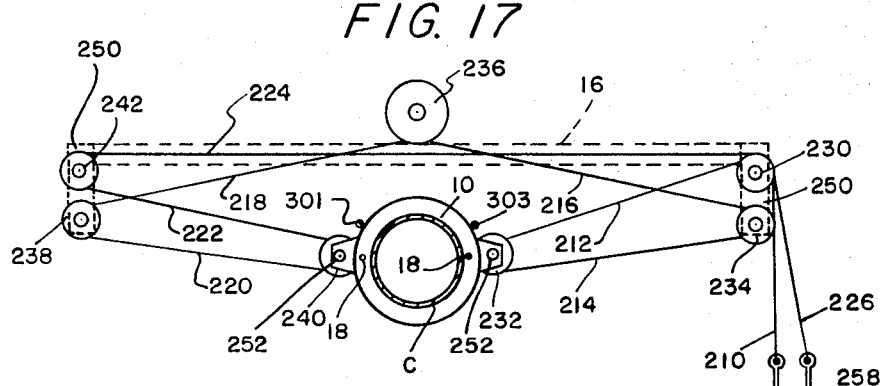
FIG. 17 is an elevational view in the nature of a schematic dealing with part of the structure shown in FIG. 16.
Figure 24:
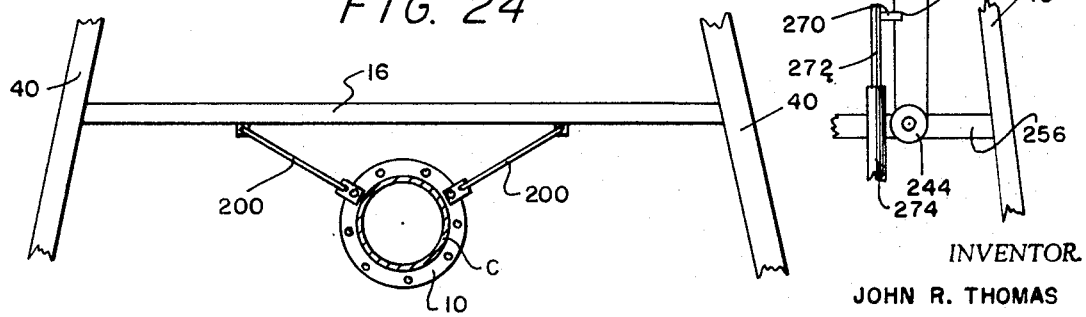
FIG. 24 is an enlarged, partial view of the conduit support on the tower most remote from the pivot center.

Reference is made particularly to FIGS. 5, 16 and 17 for the system used to control drive to towers T. This structure is applied to all towers except the tower (13 in the series) most remote from pivot P in which conduit C is securely transversely connected by cables 200 between the tower structural members and a conduit flanged connection 10 as depicted in FIG. 24. The exception for this end tower is because there is a direct connection of the hydraulic motor (driving the end tower wheels) to the source of hydraulic power and the end tower is driven at a selected constant speed with all other towers in succession (in effect) picking up position from the end tower and applying hydraulic power as needed to drive their wheels to maintain desired alignment.

Although other mechanical means could be substituted, I prefer a cable, pulley and capstan system to pick up relative movement between towers and conduit (see FIG. 23). The towers T other than the end tower have an endless cable that may be described as having portions 210, 212, 214, 216, 218, 220, 222, 224 and 226, which relate to double pulley 230, single pulley 232, single pulley 234, capstan 236, single pulley 238, single pulley 240, single pulley 242, back past double pulley 230, and down to single pulley 244, respectively. To restate the above, the sections of the cable mentioned relate to the pulleys mentioned if the system of FIGS. 16, 17 is traced starting upwardly on cable section 210 to double pulley 230 and ending downwardly on cable section 226 past the bottom pulley 244 back up again to cable section 210. The expression "double pulley 230" is used to mean two pulleys side by side independently rotating on a single axis, as this is a convenience for purposes of fabrication. The total effect of this pulley and cable system is primarily to sense, transfer and convert sidewise movement of conduit C relative to the tower T in question into rotary motion of capstan 236 (which controls valving that in turn controls drive to wheels W).

Pulleys 230, 234 and pulleys 242, 238 are supported from two arms 250 depending from tower cross member 16; pulleys 240, 232 are supported by brackets 252 secured to conduit flanges 10; capstan 236 is supported by a bifurcated support 254 upstanding from tower cross member 16; and pulley 244 is supported by an arm 256 secured to tower uprights 40. The cable has two turnbuckles 258 and two tension springs 260 in cable sections 210 and 226 for adjusting the cable system relative to capstan 236 and to maintain tension in the cable.

Capstan 236 has an end plate 264 with a cam groove 265, and a control valve assembly 266 has a cam follower 268 normally engaged in cam groove 265, whereby the position of conduit C is transferred via the cable and pulley system to control of valve 266. Valve assembly 266 is supported by a horizontal arm 267 secured to support 254. The construction of valve assembly 266 will be detailed later.

As indicated earlier in this description the system is designed so that the tower most remote from pivot P trails the most of all of the towers, the next to end tower trails the second the most of the towers (in the direction of movement), etc. The conduit C thus has a convex curvature in the direction of movement as shown in FIGS. 3 and 4. Most of the curve is located in the area of towers 10–13 (in the series from pivot tower P). If all towers were driven at constant uniform speed, the inner towers would travel an arc (i.e., 360°) faster as their paths are progressively shorter the nearer to pivot P they are. In my system, the end tower is driven at constant speed and each inner tower is driven as required to control how far ahead of the next outer adjacent tower the inner tower is. The control does not actually relate adjacent towers but instead relates each tower to the position of conduit C. To take an example, presume an intermediate tower is properly located if its frame's centerline is aligned with conduit C; then presume that conduit C shifts due to the advance of outer towers so that the centerline alignment is no longer present; then presume that the tower must "play catchup" as this relative shift of position between the conduit and tower is picked up by the pulley-cable-capstan system thereby changing the position of the valve in valve assembly 266 due to the movement of cam follower 268 produced by rotation of position of capstan cam groove 265; presume that "playing catchup" is not difficult because the inner tower can go faster around the arcuate paths than outer towers due to the shorter distance of inner arcs and presume that the hypothetical central alignment between the conduit and tower is again achieved; and presume that the regaining of alignment is sensed by the cable-pulley-capstan systems so that the valve in valve assembly 266 is moved from a faster setting to a slower setting (or even to an "off" position) due to the movement of cam follower 268 produced by rotation of position of capstan cam groove 265, whereby the system is ready to repeat this process throughout its operation.

The cable, of course, wraps around capstan 236. By the above example I do not mean to suggest that normal position is necessarily with conduit C aligned with the center of each tower T. Although this is a convenient example, instead normal position could be, for other examples, with the conduit several inches ahead or behind the tower center. Initial positioning (and adjustment at first or later) of the cable on the capstan, and of turnbuckles 258, the clocking of the cam groove 265, and the characteristics of cam follower 268 and valve assembly 266 will together determine "on" and "off" and varying speed control of motor 60 and its drive to wheels W.

The cable is secured (in portion 210) by a clamp 270 to the piston rod 272 of a hydraulic piston and cylinder 274. The purpose of associating cylinder 274 in the system is in the reversal of direction of conduit C. As will be detailed in the description of the hydraulic circuitry, cylinder 274 is connected in the system to sense reversal in direction of application of hydraulic fluid to motors 60. When reversal of direction of application of fluid to motors 60 occurs, hydraulic piston and cylinder 274 will be activated to move piston rod 272 in one direction or another. When piston rod 272 moves, the cable will move resulting in adjustment of clocking of capstan cam slot or groove 265. This is needed because the towers will move into alignment with an opposite curvature to that achieved in the first direction of conduit movement. The design of capstan cam slot or groove 265 to operate the valve assembly 266 in this opposite direction of movement will relate to various factors including the distance of "throw" of piston rod 272. The point at which cable portion 210 is clamped to piston rod 272 by clamp 270 of course relates to the general cable, pulley and capstan system and can be used to adjust what is the normal relative position of tower and conduit.

The reversal of direction is accommodated by the above system as follows: piston rod 272 moves changing the clocking of capstan cam groove 265; all motors 60 of towers T are driven as the inner towers "play catchup" (or, really, start to change from a position trailing outer towers at the beginning of movement to gain a position leading outer towers to thereby reverse curvature of conduit C so that the conduit is again convexly curved in the direction of conduit movement); inner towers are able readily to catchup (or really advance) relative outer towers particularly because they are on arcs of lesser distance; and finally the towers achieve the relationships above described in normal conduit advance in which the outermost tower is (selectively) constantly driven and inner towers are variably driven relative thereto.

The cable in winding on capstan 236 is preferably suitably secured to the capstan medially of the winding rather than depending on friction to cause the capstan to rotate responsive to cable movement.

Tower Valve Assembly and Malfunction Shut-Off System

Referring particularly to FIGS. 22 and 23, valve assembly 266 has a spool 276 with a reduced diameter portion 277 and full diameter portions 278, 279 governing passage of fluid among ports 280, 281 and 282. Ports 280, 281 control application of fluid to motors 60, whereas port 282 has a dump, malfunction-shutoff-system function to be covered later. Viewing cam slot or groove 265 in FIG. 23, the upper and lower portions are similarly, oppositely formed, which means the cam slot will have like functions in positioning of spool 276, depending on whether the towers are advancing in one direction or the opposite direction. In other words, part of the function of the automatic reversal system of piston and cylinder 274, etc., (or manual repositioning if the automatic reversal system isn't present), is to move cam slot 265 so that it will be properly positioned for opposite movement of towers.

It will be understood that as spool 276 moves from left to right as viewed in FIG. 22, the spool moves from a position blocking fluid flow from port 280 to port 281, to a position permitting that flow, and, in fact, if the spool moves far enough right, port 282 is brought into fluid communication at which point "in" and "out" flow from the hydraulic fluid source are connected (or power is shunted), causing a change in pressure sensed by a Murphy switch to terminate operation of the system. A teardrop-shaped groove of slot 283 is cut in land 279, which means that a metering function is brought into play in connection of port 280 and 281, whereby varying amounts of fluid are gradually delivered to motors 60, resulting in variable speed driving of intermediate towers T.

It is important to provide a fail-safe system so that, on severe misalignment of towers T, due to malfunction, exceeding design limits, etc., the system will shut off rather than continuing to the point of breakage of parts. The damage can be imagined if the system were to continue running, breaking conduit C, flooding crops, towers running independently until hydraulic lines were broken, etc. My irrigation system is designed to operate unattended for as long as several days, e.g., an operator is not on hand to shut down the system in case of trouble.

Figure 18:
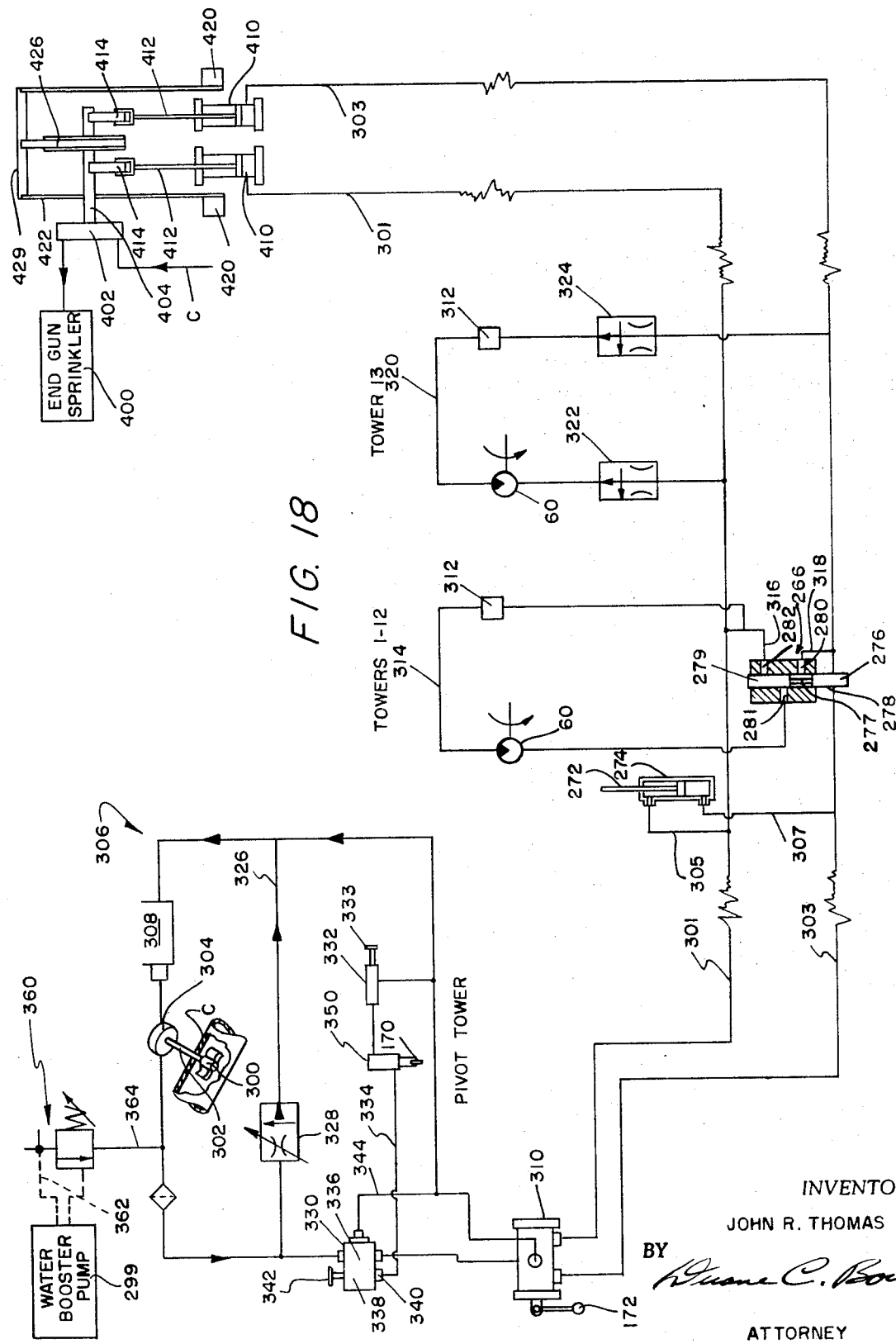
FIG. 18 is a view of diagrammatical nature indicating the hydraulic circuitry of the irrigation apparatus.

My fail-safe system is shown in FIGS. 16 and 18 and takes the form of the port 282 and associated mechanism which when operated shunts hydraulic pressure from "out" line to "in" (or suction) line (the hydraulic supply lines are interchangeably "in" and "out" lines depending on the direction of movement of the apparatus). When pressure is dumped from pressure line to suction line, through adequate sized lines, sufficient pressure is not available to operate motors 60 to drive towers T. The hydraulic system would stand still as a result of this factor alone until an operator came to reactify the situation, but, as indicated above, a Murphy switch senses change in pressure and shuts down hydraulic and water pressures and flows.

The "dump" position of spool 276 is achieved when the tower and conduit get sufficiently out of alignment (beyond limits set and designed into the system) so that the relative positioning, transferred to cam slot 265 through the cable and pulley system, results in rotation of the cam slot to the escape slot 284. At the same time an annular abutment 285 has contacted the cam surface 286 of a pivotal (gravity engaged) trigger 287 which has a slot 288 retaining an annular member 289. Spool 276 is connected to a rod 290 (on which abutment 285 is secured) which is slidably positioned in a tube 291 (on which annular member 289 is secured) which, in turn, is slidably positioned within a block 292 secured to arm 267. A compression spring 294 bears between an annular abutment 293 secured to tube 291 and block 292. The sequence of action is thus the escape of cam follower 268 from cam slot 265 through escape 284, the upward biasing of trigger 287 by the action of abutment 285 against cam surface 286, the release by trigger 287 of annular member 289, the release of spring 294 to cause tube 291 to move to the right (as viewed) and the abutment 293 strikes nuts 295 on rod 290 moving rod 290 and spool 276 to the right. The movement of the spool 276 to the right has brought dump port 282 into fluid communication, taking substantial pressure off the motors 60, and operating the Murphy switch to deactivate hydraulic and water pressures.

When an operator discovers this condition and corrects the malfunction, the valve assembly 266 can be brought back to operating condition by pressure applied on spring 294 (against abutment 293) by a pivotal lever 296 (for mechanical advantage) moving the ports to the left as viewed, whereupon member 289 is again caught by trigger 287. The capstan 236 is rotated by hand, as lever 296 is operated, to receive cam follower 268 and to clock it in operating position within cam slot 265.

It is only when something has happened so that the capstan and pulley system can not keep the tower within normal set limits of alignment with conduit C that the dump valve system is operated. For example, this might happen if one of the chains driving the sprockets broke, or if the tires failed to advance through a quagmire.

In reactivating the system once the stoppage is discovered, and after the operator first corrects whatever caused malfunction, the drive of individual towers can be controlled by individual shutoff valves on each tower until the towers are brought into desired alignment and the normal operating system again can be activated. Note that the dump valve system does not apply to the outer end tower T because (a) the conduit C is tied to the tower and (b) all other towers indirectly are controlled in alignment by the end tower, so that breakage could not occur from mislocation of the end tower T relative to the conduit C.

Hydraulic Circuitry

Power to the hydraulic circuitry H could be provided by an electric motor or by a gasoline motor (used only for this purpose or as a takeoff of a booster pump 299 used to boost water pressure from the source so that it will be elevated into conduit C and will have suitable pressure to spray out of irrigation nozzles 12). The power source shown is the use of the flow of water through line S and to conduit C as the source of power. This has some economy over providing a separate power source. FIG. 18 schematically shows a turbine 300 disposed within conduit C and having a rotary shaft 302 (with suitable bearings into the supply pipe and with suitable packing) driving a hydraulic pump 304 in the supply circuit 306. A hydraulic fluid supply reservoir 308 also connects to supply circuit 306. Hydraulic pump 304 is a constant delivery pump.

The direction of supply to lines 301, 303 (which extend along the sides of conduit C) is controlled by valve 310 which changes lines 301, 303 between pressure and suction functions. Valve 310 is of well known four-way, three-position type. An example on the market is the Gresen Model 400 control valve, with detent for three positions, manufactured by the Gresen Manufacturing Company, 405 35th Avenue N.E., Minneapolis, Minnesota 55418. Referring back to FIG. 21, valve 310 has the handle or lever 172 which is moved from the selected "on" position to "off" or "neutral" position by the action of cams or abutments 164 on ring 160.

From the previous description of the tower valve assembly, etc. much of the operation of the hydraulic system at towers 1–12 will be understood. The direction of hydraulic motor 60 (and the consequent direction of rotation of tower wheels) will be determined by which line 301, 303 is pressure and which is suction. Hydraulic piston and cylinder 274 being coupled to lines 301, 303 as diagrammatically illustrated by lines 305, 307, the cable and pulley system adjusts capstan 236 according to direction of hydraulic flow and resulted direction of movement of the towers. A shutoff valve 312 (i.e., a Globe valve) is interposed in the circuit 314 to motor 60 for shutoff or control of the tower hydraulics on such occasions as needed, such as during repair, during initial setup when hydraulic power is on and each tower is being located, etc. The end tower (13) likewise has a shutoff valve 312. The dump port of valve assembly 266 is connected to circuit 314 by line 316 for shunting of pressure between lines 301 and 303 when spool 276 moves to dump position. Circuit 314 is diagrammatically shown as connected to line 303 via ports 281 and 280 and line 318, and, of course, when spool 276 is in "off" position blocking communication between ports 280, 281, no power is applied to motor 60.

The end tower (13 in the series from the pivot tower in the normal 13-tower setup for a quarter-section of land) is constantly driven at selected constant speed as long as there is hydraulic pressure being supplied to drive the towers, so its motor 60 is always connected by a circuit 320 between the main hydraulic lines 301, 303, except when its shutoff valve 312 blocks application of power. Speed control of hydraulic motor 60 is controlled by flow regulators 322, 324. These are schematically shown as two members for clarity of illustration, although they can be combined in one part which, in effect, is two members 322, 324 back to back.

An example of products available on the market for flow regulators 322, 324 is the Series 5-Adjustable pressure compensated constant flow control valve sold under the trademark "Pneu-Trol" by Deltrol Corporation, Grant and 30th Avenues, Bellwood, Illinois 60104. (The combined back-to-back unit is available from the same company as Series 8-Adjustable Bidirectional constant flow control valve which permits adjustment of flow in either direction.). The Series 5 valve is single directional and provides selected regulation of flow at varying pressures and temperatures. Adjustment of output gallonage is independent of inlet pressures and has free reverse flow.

The adjustments of flow regulators 322, 324 determine the speed of the end tower and the time, for example, of a 360° rotation of the system. Commonly the minimum speed for such 360° rotation of the system will be 100–110 hours and the maximum speed will be around 16 hours, presuming, of course, the irrigation program involves a simple 360° rotation rather than travel through a lesser arc. Tower 13 of course does not have a valve assembly 266, capstan 236, or the pulley and cable system, because the end tower sets the speed of operation and all other towers are, in effect, positioned relative to the end tower.

Turning back to the hydraulic circuitry at the pivot center tower P, pump 304 (and the power thereto) is provided of sufficient capacity to take care of maximum power requirements (when the irrigation system has the fastest arcuate travel). The gallonage requirements are much different, of course, between 16 hours or less for a 360° revolution to 100–110 hours or more for a 360° revolution. For this reason, a bypass line 326 is provided across circuit 306 and an adjustable flow regulator 328 is provided in line 326, to bypass excess gallonage capacity. Flow regulator is adjusted for the general speed to be used in an irrigation operation, e.g., some excess gallonage is maintained in circuit 306 but the most of the excess gallonage is bypassed. For example, pump 304 may have a capacity of 15 gallons/minute, but for the selected speed of arcuate travel 2–4 gallons/minute is adequate in circuit 306 to provide plenty of gallonage through lines 301, 303. The excess, thus, of 11–13 gallons/minute is bypassed through line 326, by flow regulator 328. Pump 304 is provided with excess capacity over normal irrigation requirements, for example because it may be desirable to drive towers T at a faster speed than irrigation operating speeds on occasion. Such an occasion might be when a crop in a sector of 90° arcuate travel has been irrigated and it is desired to irrigate the 90° sector again. It is not desirable merely to reverse the system, because in the reverse cycle, the last irrigated crop would be first irrigated and the first irrigated crop would be last irrigated. The operator however, may operate the system for a very fast reverse travel through 90° (using much of the capacity of pump 304), perhaps without any water irrigation in the process, so that the equipment is quickly brought back to condition to travel the 90° arc again in the same direction of travel as before.

An example of a priority type flow regulator suitable for use as member 328 is an adjustable pressure compensated priority type flow regulator Model 13-2-6, manufactured by Fluid Power Accessories, Inc., 661 South Glenn Avenue, Wheeling, Illinois 60090. This regulator has a bypass port which is plugged for the present purposes. The regulator is adjustable from 0.1 to 21.0 g.p.m. One reason to divert excess gallonage through flow regulator 328 is to maintain system sensitivity in lines 301 and 303 so that dumpage (via dump port 282 of tower valve assembly 266) can be readily sensed by a Murphy switch. For example, without the bypass system, at certain operating speeds, a dump at tower 12 might only result in 150 No. drop in pressure without bypass, as contrasted to a 700 No. drop with a bypass avoiding pumping excess gallonage into the system, and interference with the bleed functioning of relief valve 330, next to be described (which is involved with end gun nozzle control).

An example of relief valve 330 is shown in the Double A Bulletin S-1002 on the BT Series relief valves, Brown and Sharpe, Manchester, Michigan. The relief valve 332 on the vent or bleed line 334 is similar to the pilot valve section of relief valve 330 and is identified in the Double A bulletin as remote control valve CA-02. The relief valve 330 is of balanced piston design and has two sections: (a) a main body section 336 containing a piston held in place by spring means and (b) a control head section 338 hydraulically controlling movement of the main piston and consisting of a control section cone, spring, adjustment plunger, and vent connection 340. The pilot controlled relief valve prevents system pressure from rising above the level selected by adjustment knob 342. Valve 330 opens whenever the system pressure exceeds the pressure setting (i.e., 1,300 p.s.i.) selected by knob 342, permitting enough fluid to bypass through line 344 back to reservoir or tank 308 to prevent any further increase in pressure. Remote operation of valve 330 is provided by vent or bleed line 334 and remote adjustable relief control valve 332 (having an adjustment knob 333). As stated before, the remote control valve is similar to the pilot valve section 338 of valve 330 and this can be set for a different pressure (i.e., 1,100 p.s.i.). It will be understood, thus, that pressure enters lines 301, 303 at a maximum of 1,100 p.s.i. as long as remote control valve 332 is operative, and will increase to a maximum of 1,300 p.s.i. when the remote relief valve 332 is inoperative and the 1,300 p.s.i. setting of valve 330 is controlling, to use the two pressure values selected for the example. The purpose of the valves 330, 332 will be understood, in the example, if it is presumed the irrigation end gun nozzle operates at a 1,300 p.s.i. pressure but does not operate at 1,100 p.s.i. pressure. Actually, of course, there will be some tolerances in pressures responsive to settings, some pressure loss past tower 13 in the pressure line 301 or 303, etc., but in design of the system and in initial factory or field adjustment the proper settings of valves 330, 332 (or, conversely, the proper weight of end gun counterbalance) can be developed for operation of the end gun responsive to whether the pressure setting of valve 330 or 332 is operative.

The end gun control is the radial control function shown for the operation of valves 330, 332, although, of course, the system differential in pressures could be used for any other desirable control function, radially responsive or otherwise, which would be initiated by blockage of vent line 334. The blockage of vent line 334 is shown to be controlled by a member 350 which is simply an "on," "off" valve operated by cam follower 170 (FIG. 21) moved from lower position (permitting flow through vent line 334 maintaining 1,100 No. pressure) to an upper position (blocking flow through vent line 334 providing 1,300 No. pressure) when cam follower 170 rides up on a cam 162 on ring 160, which, as discussed before, will normally be set according to the radial area at the corners of, for example, a square tract of land to be irrigated by an end gun nozzle.

Before moving to a description of the end gun nozzle structure, the circuitry at 306 will be completed by description of the Murphy pressure safety switch 360. Murphy switches are well known. These are manufactured by Frank W. Murphy Manufacturer, Inc., Tulsa, Oklahoma. Member 360 may be taken as representative of a Murphy switch having a low and high pressure setting and controlling an electric circuitry 362 as pressures go above or below the settings. In the pressure examples given above, the maximum pressure can be set at 1,600 p.s.i. and the minimum pressure set at 900 p.s.i., meaning that electrical circuitry 362 will be broken at higher or lower pressures. This means when dump occurs between lines 301, 303 by operation of dump port 282 of tower valve assembly 266, the pressures go down below 900 p.s.i. which is sensed by Murphy switch 360 via line 364. The electrical circuitry 362 will vary according to choice and source of hydraulic power but in the example given of drive of pump 304 by water turbine 300, it is the water booster pump 299 which is stopped (i.e., by electrical disconnect in case of electric booster pump power or by ignition disconnect in the case of gasoline engine booster pump power, for examples). When the water booster pump is deactivated, water is not raised into conduit C and irrigation terminates and water does not pass turbine 300 and hydraulic power terminates until an operator arrives on the scene to correct malfunctioning and reactivate the system.

End Irrigation Nozzle Gun

End irrigation nozzle guns or the like are well known in the art. They irrigate, usually on an oscillatory cycle, through a selected arc. Examples are Models 85TNT and 95TNT, Rain Bird Part Circle Sprinklers, Rain Bird Sprinkler Manufacturing Corporation, Glendora, California. Selection and sizing of the part circle sprinklers depend on the amount of water to be distributed (as does the other sprinklers 12).

The end gun irrigation sprinkler 400 is controlled as to flow of water thereto from conduit C by a valve 402 which may be simply a butterfly valve. Valve 402 is moved between "on" and "off" positions by rotation of a shaft 404. The assembly is schematically shown in FIG. 18 as including two vented hydraulic pistons and cylinders 410 associated with lines 301, 303 (only one cylinder at a time really requires connection of lines 301, 303 to the cylinder, depending on which was the pressure line in the given direction of irrigation equipment rotation) and responsive to the pressurized line. The piston rods 412 are connected to shaft 404 through cranks 414. The piston rods would pivot shaft to move valve 402 to the "on" position of the end nozzle 400 if it were not for the counterweights 420 of a weight and location so that the 1,100 No. pressure would be counteracted but not the 1,300 No. pressure, in the example given, so that the end nozzle 400 will only be turned on when cam follower 170 shuts valve 350. Counterweights 420 are supported on arms 422 which are securely fastened to a pivotal shaft 429. Shafts 404 and 429 are each supported by suitable bearings (not shown) and are connected by suitable crank and link means 426. The construction of the counterweight assembly, and the design and adjustment thereof to accomplish the above, or the substitution of springs for counterweights, will be readily understood by those working in the art.

Having thus described my invention, I do not wish to be limited to the exact details of construction shown, but instead I wish to cover those modifications thereof which will occur to those skilled in the art after learning of my invention and which are properly within the scope of my invention.

I claim:

1. In a self-propelled irrigation apparatus having a water supply conduit supported intermediate its ends by a series of mobile supports having wheel means, the conduit being pivotal about a fixed pivotal support at one end which includes a water source pipe connected to said conduit, the improvement comprising:
    a. drive means connected to said wheel means to power the same to pivot said conduit;
    b. source of pressurized fluid connected to said drive means;
    c. first control means at said fixed support for controlling application of pressurized fluid to said drive means whereby system operation can be initiated and terminated at said fixed support; and
    d. second control means for controlling the speed and relative position of said mobile supports whereby said conduit is curved in form with its outer end trailing in the direction of pivotal movement.

2. The combination according to claim 1 wherein said drive means includes hydrostatic fluid rotary motors driving the associated wheel means continuously whenever adequately pressurized hydraulic fluid is applied to each motor, and each motor having valve means associated therewith variably metering fluid to the associated motor and means responsive to the location of the associated mobile support relative to the line represented by said conduit and mobile supports operative to variably control said valve means.

3. The combination according to claim 1 wherein said source of fluid is located at said fixed support, two hydraulic lines extending along said conduit and connected to said source, said drive means being connected to said lines to receive pressurized fluid from one line to power the same and to return fluid to the other line, and said first control means being operative to reverse direction of flow in said lines so that the pressure line becomes the return line and so that the return line becomes the pressure line whereby the direction of motors powering said wheel means can be reversed to thereby reverse the direction of pivotal movement of said conduit.

4. The combination according to claim 1 wherein each mobile support except the end mobile support most remote from said pivotal support has an adjustable control valve controlling whether hydraulic fluid will be fed to the respective drive means and as to how much fluid will be fed thereby controlling start and stop and speed of the mobile support, the end mobile support having intervening flow regulation means whereby the pivotal speed of the conduit is set by said flow regulation means controlling speed of the end mobile support, each mobile support other than said end support having valve operating means acting upon the respective control valve and turning power on and off and adjusting power to the respective drive means by sensing relative position of mobile support and the conduit at that location.

5. The combination according to claim 1 wherein the pivotal speed of said conduit is set by the end mobile support most remote from said fixed pivotal support, which end support has hydraulic speed control means selectively set at said end mobile support, and the other mobile supports have drive control means controlling mobile support drive at speeds needed to maintain relative support and conduit positions.

6. In a self-propelled irrigation apparatus having a water supply conduit supported intermediate its ends by a series of mobile supports having wheel means and the conduit being pivotal about a fixed pivotal support at one end which includes a water source pipe connected to said conduit, the improvement comprising:
   a. each mobile wheeled support having a motor connected to said wheel means to power the same to pivot said conduit;
   b. a common source of pressurized oil hydraulic fluid connected to the motors to power the same;
   c. control means at said fixed support controlling application of pressurized oil to said motors whereby system operation can be initiated and terminated at said fixed support, said control means including a four-way, three position valve controlling application of fluid to said lines, two positions thereof changing directions of fluid in said lines and the third position shutting off application of pressure to said lines thereby to stop movement of said mobile supports;
   d. said common source of fluid being located at said fixed support, two hydraulic lines extending along said conduit and connected to said common source, said motors being connected to said lines to receive pressurized fluid from one line to power the same and to return fluid to the other line, and said control means being operative to reverse direction of flow in said lines so that the pressure line becomes the return line and so that the return line becomes the pressure line whereby the direction of motors powering said wheel means can be reversed to thereby reverse the direction of pivotal movement of said conduit.

7. The subject matter of claim 6 in which said fixed support includes a tower with a ring concentric with the pivotal axis of said conduit, and adjustable stop means on said ring, and said valve being movable with said conduit and having a control lever in position to be contacted by said stop means on said ring whereby said valve can be moved from one of said positions applying pressure to one of said lines to the third "off" position by said control level striking said stop means which is set at the radial location where termination of irrigation is desired.

8. In a self-propelled irrigation apparatus having a water supply conduit supported intermediate its ends by a series of mobile supports having wheel means and the conduit being pivotal about a fixed pivotal support at one end which includes a water source pipe connected to said conduit, the improvement comprising:
   a. each mobile wheeled support having a motor connected to said wheel means to power the same to pivot said conduit;
   b. a common source of pressurized oil hydraulic fluid connected to the motors to power the same;
   c. control means at said fixed support controlling application of pressurized oil to said motors whereby system operation can be initiated and terminated at said fixed support;
   d. said common source of fluid being located at said fixed support, two hydraulic lines extending along said conduit and connected to said common source, said motors being connected to said lines to receive pressurized fluid from one line to power the same and to return fluid to the other line, each mobile support except the end mobile support most remote from said pivotal support having an adjustable control valve controlling whether hydraulic fluid will be fed to the respective motor and as to how much fluid will be fed thereby controlling start and stop and speed of the mobile support, the end mobile support being continuously connected to said lines and having intervening flow regulation means whereby the pivotal speed of the conduit is set by said flow regulation means controlling speed of the end mobile support, each mobile support other than said end support having valve operating means acting upon the respective control valve and turning power on and off and adjusting power to the respective motor by sensing relative position of mobile support and the conduit at that location;
   e. each mobile support including a mobile tower and guy wires supporting the conduit from each tower, the support of the guy wires at each mobile tower other than the end mobile support permitting some shifting of relative position between mobile tower and the conduit at that location, each valve operating means including pulley, cable and rotary capstan means whereby said relative position is reflected in the rotary position of the capstan, and the capstan being connected to the respective control valve to determine "on," "off" and "speed" positioning of said control valve.

9. The subject matter of claim 8 in which each control valve has a "dump" position connecting said lines without passing through the respective motor, thereby shunting pressure between the lines, and said control means including a switch operative to control operation of said irrigation apparatus, said switch being sensitive to pressure in the hydraulic system and operating to shut off operation of said irrigation apparatus upon "dump" of pressure between said lines.

10. The subject matter of claim 9 in which there is a powered water pump for boosting pressure of water and to force water from said water source pipe into said conduit, and said switch controlling power to said pump.

11. The subject matter of claim 8 in which said cable means includes a hydraulic piston and cylinder with a piston rod connected to said cable means, and said lines being connected at opposite sides of said piston whereby reversal of direction of fluid in said lines results in adjusted capstan position via said piston and cylinder and cable means.

12. In a self-propelled irrigation apparatus having a water supply conduit supported intermediate its ends by a series of mobile supports having wheel means and the conduit being pivotal about a fixed pivotal support at one end which includes a water source pipe connected to said conduit, the improvement, comprising:
   a. each mobile wheeled support having a motor connected to said wheel means to power the same to pivot said conduit
   b. a common source of pressurized oil hydraulic fluid connected to the motors to power the same
   c. control means at said fixed support controlling application of pressurized oil to said motors whereby system operation can be initiated and terminated at said fixed support
   d. a water turbine in said conduit and a hydraulic fluid pump connected to said turbine whereby the pressurization and flow of hydraulic fluid is accomplished by flow of water through said conduit.

13. In a self-propelled irrigation apparatus having a water supply conduit supported intermediate its ends by a series of mobile supports having wheel means and the conduit being pivotal about a fixed pivotal support at one end which includes a water source pipe connected to said conduit, the improvement, comprising:
   a. each mobile wheeled support having a motor connected to said wheel means to power the same to pivot said conduit
   b. a common source of pressurized oil hydraulic fluid connected to the motors to power the same
   c. control means at said fixed support controlling application of pressurized oil to said motors whereby system operation can be initiated and terminated at said fixed support
   d. pump means pumping hydraulic fluid from said source, and said pump means having excess capacity for fast nonirrigation-cycle pivoting of said conduit, and there being a by-pass line across said common source of fluid and an adjustable flow regulator in said bypass line which can be set to bypass excess gallonage capacity of said pump during normal irrigation-cycle pivotal speeds of said conduit.

14. In a self-propelled irrigation apparatus having a water supply conduit supported intermediate its ends by a series of mobile supports having wheel means and the conduit being pivotal about a fixed pivotal support at one end which includes a water source pipe connected to said conduit, the improvement, comprising:
   a. each mobile wheeled support having a motor connected to said wheel means to power the same to pivot said conduit
   b. a common source of pressurized oil hydraulic fluid connected to the motors to power the same
   c. control means at said fixed support controlling application of pressurized oil to said motors whereby system operation can be initiated and terminated at said fixed support
   d. the end of said conduit remote from said pivotal support having an end gun sprinkler to be operated at corner areas of a rectangular tract of land being irrigated, an end gun control valve, counterforce means connected to said end gun control valve normally acting to hold said end gun control valve in "off" position, hydraulic piston and cylinder means having a piston rod connected to said end gun control valve and operative upon sufficient hydraulic pressure to overcome said counterforce means to move said end gun control valve means to "on" position, said hydraulic piston and cylinder being connected to said common source of hydraulic fluid, and hydraulic pressure level control means operative to change pressure in said common source form a level ineffective to overcome said counterforce to a higher level sufficient to overcome said counterforce to thereby turn on said end gun part-circle sprinkler.

15. The subject matter of claim 14 in which there is a tower at said fixed support and a ring on said tower concentric about the axis of pivoting of said conduit, and adjustable cam means on said ring, said common source of fluid including a pilot controlled relief valve having a vent line with a remote control valve, the remote control valve being set at a pressure lower than that required to operate the end gun control valve and the pilot controlled relief valve being set at a pressure high enough to operate said end gun control valve, and a plunger controlled valve operative to block said vent line, and said plunger being positioned to be acted upon by said cam means, whereby depending on the radial location of said cam means on said ring which corresponds to a corner area of said tract of land, said end gun part-circle sprinkler is operated.

16. The subject matter of claim 14 in which said counterforce means is a counterweight.

17. In a self-propelled irrigation apparatus having a water supply conduit supported intermediate its ends by a series of mobile supports having wheel means and the conduit being pivotal about a fixed pivotal support at one end which includes a water source pipe connected to said conduit, the improvement comprising:
   a. each mobile wheeled support having a motor connected to said wheel means to power the same to pivot said conduit;
   b. a common source of pressurized oil hydraulic fluid connected to the motors to power the same;
   c. control means at said fixed support controlling application of pressurized oil to said motors whereby system operation can be initiated and terminated at said fixed support;
   d. each motor being a hydrostatic fluid rotary motor driving the associated wheel means continuously whenever adequately pressurized oil hydraulic fluid is applied to each motor, and each motor having valve means associated therewith variably metering fluid to the associated motor and means responsive to the location of the associated mobile support relative to the line represented by said conduit and mobile supports operative to variably control said valve means;
   e. said conduit having an end gun nozzle and means hydraulically operating said nozzle at clocked positions set at said fixed support.

18. In a self-propelled irrigation apparatus having a water supply conduit supported intermediate its ends by a series of mobile supports having wheel means and the conduit being pivotal about a fixed pivotal support at one end which includes a water source pipe connected to said conduit, the improvement comprising;
   a. each mobile wheeled support having a motor connected to said wheel means to power the same to pivot said conduit;
   b. a common source of pressurized oil hydraulic fluid connected to the motors to power same;
   c. control means at said fixed support controlling application of pressurized oil to said motors whereby system operation can be initiated and terminated at said fixed support;
   d. each motor being a hydrostatic fluid rotary motor driving the associated wheel means continuously whenever adequately pressurized oil hydraulic fluid is applied to each motor, and each motor having valve means associated therewith variably metering fluid to the associated motor and means responsive to the location of the associated mobile support relative to the line represented by said conduit and mobile supports operative to variably control said valve means;
   e. wheel drive control means at mobile supports including means to dump hydraulic pressure at the location of the mobile support if relative conduit and mobile support positions get out of line beyond preset limits, and said control means being operative to terminate apparatus operation upon hydraulic dump.

19. In a self-propelled irrigation apparatus having a water supply conduit supported intermediate its ends by a series of mobile supports having wheel means and the conduit being pivotal about a fixed pivotal support at one end which includes a water source pipe connected to said conduit, the improvement, comprising:
- a. each mobile wheeled support having a motor connected to said wheel means to power the same to pivot said conduit
- b. a common source of pressurized oil hydraulic fluid connected to the motors to power the same
- c. control means at said fixed support controlling application of pressurized oil to said motors whereby system operation can be initiated and terminated at said fixed support
- d. said common source of hydraulic fluid being continuously connected to the motor of the end mobile support most remote from said fixed pivotal support when the apparatus is operated so that pivotal speed of said conduit is set by the speed of the end mobile support, and drive control means at the other mobile supports controlling mobile support drive at speeds needed to maintain relative support and conduit positions, and operating means for said drive control means including pulley, cable and rotary capstan means connected to mobile supports and conduit to reflect relative support and conduit positions by rotary capstan means position.

20. In a self-propelled irrigation apparatus having a water supply conduit supported intermediate its ends by a series of mobile supports having wheel means and the conduit being pivotal about a fixed pivotal support at one end which includes a water source pipe connected to said conduit, the improvement, comprising:
- a. each mobile wheeled support having a motor connected to said wheel means to power the same to pivot said conduit
- b. a common source of pressurized oil hydraulic fluid connected to the motors to power the same
- c. control means at said fixed support controlling application of pressurized oil to said motors whereby system operation can be initiated and terminated at said fixed support
- d. each mobile support including a tower, said conduit having between adjacent towers a plurality of crossarms extending laterally to each side of said conduit, generally horizontally extending flexible tension members partly parallel to said conduit and partly extending in an "X" bracing manner connecting the ends of said crossarms and connecting to each tower at points spaced laterally of said conduit as to flexible tension members between adjacent crossarms and the outermost tower but not connecting to the innermost tower of adjacent towers, and said flexible tension members extending in an inner direction from said crossarms adjacent to said innermost tower to connect to said conduit close to the plane of the innermost tower, whereby bending of said conduit occurs more in the area from a tower to the next adjacent crossarm in an inner direction than in other areas and whereby motion is transferred from a tower to the next innermost tower.

21. In a self-propelled irrigation apparatus having a water supply conduit supported intermediate its ends by a series of mobile tower supports having wheel means and the conduit being pivotal about a fixed pivotal support at one end which includes a water source pipe connected to said conduit, means sensing relative conduit and mobile support positions and controlling power to the wheel means, comprising:
- a. power means to said wheel means and control means for said power means
- b. cable and pulley means connected to said conduit and a tower and said control means operative to move said control means upon shifting of relative position between the conduit and the tower so that said control means acts upon said power means to restore relative positioning of conduit and tower, and
- c. said power means being hydraulic and said control means including a spool hydraulic valve having a spool moved by said cable and pulley means, said spool valve having land and port means including a slot tapered longitudinally of said spool operative to meter hydraulic fluid to vary power to said wheel means responsive to power requirements transmitted to said control means by said cable and pulley means.

22. In a self-propelled irrigation apparatus having a water supply conduit supported intermediate its ends by a series of mobile tower supports having wheel means and the conduit being pivotal about a fixed pivotal support at one end which includes a water source pipe connected to said conduit, means sensing relative conduit and mobile support positions and controlling power to the wheel means, comprising:
- a. power means to said wheel means and control means for said power means
- b. cable and pulley means connected to said conduit and a tower and said control means operative to move said control means upon shifting of relative position between the conduit and the tower so that said control means acts upon said power means to restore relative positioning of conduit and tower, and
- c. said control means including a rotary capstan and said cable means being wound upon said capstan and secured thereto in the middle of the winding, whereby relative movement of conduit and tower is reflected in rotary adjustment of position of said capstan.

23. The subject matter of claim 22 in which said capstan has a cam track on one end and a cam follower in said cam track, whereby relative movement of conduit and tower is reflected in movement of said cam follower.

24. The subject matter of claim 23 in which said power means is hydraulic and in which said control means includes a spool hydraulic valve connected to said cam follower and having "in" and "out" hydraulic ports and said spool valve having a land including a tapered slot in said land, whereby "off" power position is defined when said cam follower moves said land to block flow between ports, "on" power position is defined when said land does not block flow, and "speed" positions are defined by communication between said ports via said tapered slot and by the extent of said slot exposed for flow in the particular position of the cam follower.

25. The subject matter of claim 24 in which said spool valve has a third port which shunts said power means and dumps hydraulic pressure when the cam follower moves the valve to position permitting flow to said third port, and said power means having termination means terminating application of power upon change of pressure due to dumping, whereby said power means is shut off when tower and conduit relative positions change excessively.

26. The subject matter of claim 25 in which said cam track has an escape slot, spring means directed to tend to pull said cam follower through said slot, and trigger and latch means normally holding said spring means against applying force on said cam follower, said trigger and latch means releasing said spring means when said cam follower reaches a position indicating severe tower and conduit misalignment, whereby said spring means is then released and forces said cam follower out said escape slot and moves said spool valve to dump position.

27. The subject matter of claim 26 in which a rod is connected to said spool valve and cam follower, an abutment through which said rod passes, said spring means acting between said abutment and rod, a tube receiving said rod and slidable in said abutment, a latching boss on said tube, a pivotal trigger on said boss and acting to catch said latching boss and having a cam end, and a cam member on said rod in position to act on said cam end of said trigger thereby to cause said trigger to release said latching boss to permit said spring to act.

28. In a self-propelled irrigation apparatus having a water supply conduit supported intermediate its ends by a series of mobile tower supports having wheel means and the conduit being pivotal about a fixed pivotal support at one end which includes a water source pipe connected to said conduit, means sensing relative conduit and mobile support positions and controlling power to the wheel means, comprising:
  a. power means to said wheel means and control means for said power means
  b. cable and pulley means connected to said conduit and a tower and said control means operative to move said control means upon shifting of relative position between the conduit and the tower so that said control means acts upon said power means to restore relative positioning of conduit and tower, and
  c. said power means being hydraulic and said control means having a position to dump hydraulic pressure at the tower of the entire power means when the conduit and tower are too far out of line, and said power means having means sensitive to pressure change due to dumping to shut off application of power.

29. In a self-propelled irrigation apparatus having a water supply conduit supported intermediate its ends by a series of mobile tower supports having wheel means and the conduit being pivotal about a fixed pivotal support at one end which includes a water source pipe connected to said conduit, means sensing relative conduit and mobile support positions and controlling power to the wheel means, comprising:
  a. power means to said wheel means and control means for said power means
  b. cable and pulley means connected to said conduit and a tower and said control means operative to move said control means upon shifting of relative position between the conduit and the tower so that said control means acts upon said power means to restore relative positioning of conduit and tower, and
  c. said conduit having between adjacent mobile support towers a plurality of crossarms extending laterally to each side of said conduit, generally horizontally extending flexible tension members partly parallel to said conduit and partly extending in a "X" bracing manner connecting the ends of said crossarms and connecting to each tower at points spaced laterally of said conduit as to flexible tension members between adjacent crossarms and the outermost tower but not connecting to the innermost tower of adjacent towers, and said flexible tension members extending in an inner direction from said crossarms adjacent to said innermost tower to connect to said conduit close to the plane of the innermost tower, whereby bending of said conduit occurs more in the area from a tower to the next adjacent crossarm in an inner direction than in other areas and whereby motion is transferred from a tower to the area of the next innermost tower.

30. The subject matter of claim 22 in which said cable means is endless, said power means being hydraulic and including two hydraulic lines extending along said conduit and a source of pressurized hydraulic fluid at said pivotal support, a hydraulic cylinder and a piston therein, and said two hydraulic lines being connected to said cylinder at opposite sides of said piston, and said piston having a piston rod connected to said cable means, said power means being reversed to power said wheel means in opposite pivotal movement of said conduit upon reversal of pressure in said lines, whereby upon reversal of pressure in said lines said piston rod is moved thereby moving said cable means and causing rotary adjustment of position of said capstan to accommodate reversed pivotal direction of said conduit.

31. In a self-propelled irrigation apparatus having a water supply conduit supported intermediate its ends by a series of mobile tower supports having wheel means and the conduit being pivotal about a fixed pivotal support at one end which includes a water source pipe connected to said conduit, the improvement, comprising:
  a. said conduit having between adjacent towers a plurality of crossarms extending laterally to each side of said conduit
  b. generally horizontally extending flexible tension members partly parallel to etc., conduit and partly extending in "X" bracing manner connecting the ends of said crossarms and connecting to each tower at points spaced laterally of said conduit as to flexible tension members between adjacent crossarms and the outermost tower but not connecting to the innermost tower of adjacent towers, and
  c. said flexible tension members extending in an inner direction from said crossarms adjacent to said innermost tower to connect to said conduit close to the plane of the innermost tower, whereby bending of said conduit occurs more in the area from a tower to the next adjacent crossarm in an inner direction than in other areas and whereby motion is transferred from a tower to the area of the next innermost tower.

32. The subject matter of claim 31 in which there is a set of guy wires from the top of each tower in the vertical plane of said conduit slanting with respect to the vertical and connecting to said conduit thereby supporting the weight of said conduit.

33. The subject matter of claim 31 in which there is pulley and cable means, said cable means extending through said pulleys, part of the pulleys being on each tower and part on the conduit, there being power means to the wheel means for each tower and control means for said power means, and said cable means connecting to said control means, whereby upon relative shifting between a tower and the conduit this is reflected in the control of power to the wheel means to restore relative tower and conduit positions.

34. The subject matter of claim 33 in which said control means includes a rotary capstan and said cable means being wound around said capstan.

35. In a self-propelled irrigation apparatus having a water supply conduit supported intermediate its ends by a series of mobile supports each having a pair of wheels and the conduit being pivotal about a fixed pivotal support at one end which includes a water source pipe connected to said conduit, the improvement, comprising:
  a. said supports having wheel bearing means for each wheel permitting adjustment of position of the wheel about a vertical axis between a first normal conduit pivoting position substantially at right angles to said conduit and a second position parallel to said conduit during towing he apparatus from location to location
  b. an arm extending laterally of said vertical axis and secured to said wheel-bearing means for holding said wheel in position against pivoting about said vertical axis, a detachable radius rod between the wheel and support for holding the wheel in said second position
  c. said support having securing means to secure said arm in the first position of said wheel including a pair of setscrews on opposite sides of said arm to set arm in position for the wheel to properly track in said first position.

36. The subject matter of claim 35 in which said arm is pivotal up and down whereby said arm is releasable from between said setscrews by pivoting downwardly, and said support having removable bolt means below said setscrews for holding said arm in position between said setscrews.

37. In a self-propelled irrigation apparatus having a water supply conduit supported intermediate its ends by a series of mobile tower supports having wheel means and the conduit being pivotal about a fixed pivotal support at one end which includes a water source pipe connected to said conduit, the method of operation, comprising:
  a. applying hydraulic power to drive said wheel means by applying power continuously to the tower support farthest from said pivotal support and by applying power variably to the other tower supports to substantially maintain relative support and conduit positions
  b. dumping hydraulic pressure at any of said other tower supports when relative support and conduit positions thereat exceed selected limits in change in alignment, and thereby terminating hydraulic power to all wheel means.

38. In a self-propelled, hydraulically driven irrigation apparatus having a water supply conduit supported intermediate its ends by a series of mobile tower supports having wheel means and the conduit being pivotal about a fixed pivotal support at one end which includes a water source pipe connected to said conduit, said conduit having at its end opposite said pivotal support an end gun nozzle for sprinkling the corners of rectangular areas, and a valve for said end nozzle, the method of operation, comprising:
  a. applying a counterforce to said valve and applying hydraulic pressure to said valve in opposition to said counterforce, the opening of said valve to sprinkle said corners depending on whether the counterforce or hydraulic pressure is greater
  b. at the corners changing the relative forces of said counterforce and hydraulic pressure by changing the hydraulic pressure to change the position of said valve from "off" to "on."

39. In a self-propelled irrigation apparatus having a water conduit supported intermediate its ends by a series of mobile tower supports having wheel means and the conduit being pivotal about a fixed pivotal support at one end which includes a water source pipe connected to said conduit, means sensing relative conduit and mobile support positions controlling power to the wheel means, comprising:
  a. power means to said wheel means,
  b. control means for said power means at each tower support other than the tower support most remote from said pivotal support controlling said power means thereat so that change in position of the tower support relative to said conduit results in operation of said power means to restore relative positioning of said conduit and tower,
  c. said control means being variously set at said other tower supports to produce an arc in said conduit which is convex in the direction of advance of said conduit, and
  d. means connected to said control means at said other tower supports and operable from the location of said pivotal support to change the setting of said control means at each other tower support upon reversal of direction of movement of said conduit to change the setting of each control means to produce an arc in said conduit convexly opposite to the arc of said conduit before reversal.

* * * * *